(12) United States Patent
Chang et al.

(10) Patent No.: US 12,047,912 B2
(45) Date of Patent: Jul. 23, 2024

(54) COMMUNICATION METHOD AND APPARATUS

(71) Applicant: Huawei Technologies Co., Ltd., Shenzhen (CN)

(72) Inventors: Junren Chang, Beijing (CN); Xiao Xiao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 443 days.

(21) Appl. No.: 17/334,385

(22) Filed: May 28, 2021

(65) Prior Publication Data

US 2021/0289480 A1   Sep. 16, 2021

Related U.S. Application Data

(63) Continuation of application No. PCT/CN2019/121865, filed on Nov. 29, 2019.

(30) Foreign Application Priority Data

Nov. 29, 2018 (CN) .......................... 201811444611.X

(51) Int. Cl.
*H04W 72/02* (2009.01)
*H04W 72/04* (2023.01)

(52) U.S. Cl.
CPC ........... *H04W 72/02* (2013.01); *H04W 72/04* (2013.01)

(58) Field of Classification Search
None
See application file for complete search history.

(56) References Cited

U.S. PATENT DOCUMENTS

| 11,177,971 | B2* | 11/2021 | Pinheiro | ............... H04W 76/14 |
| 2015/0092656 | A1* | 4/2015 | Lindh | .................. H04L 67/14 |
| | | | | 370/312 |
| 2018/0115980 | A1* | 4/2018 | Pajukoski | ............. H04W 72/30 |
| 2018/0123763 | A1 | 5/2018 | Yu | |
| 2018/0213379 | A1 | 7/2018 | Xiong et al. | |
| 2021/0282121 | A1* | 9/2021 | Selvanesan | ............. H04W 4/46 |

FOREIGN PATENT DOCUMENTS

| CN | 104981021 A | 10/2015 |
| CN | 105684508 A | 6/2016 |
| CN | 106331980 A | 1/2017 |
| CN | 105379405 B | 9/2019 |
| WO | 2014048486 A1 | 4/2014 |
| WO | 2015188345 A1 | 12/2015 |
| WO | 2017030338 A1 | 2/2017 |
| WO | 2018202034 A1 | 11/2018 |

* cited by examiner

*Primary Examiner* — Yaotang Wang
(74) *Attorney, Agent, or Firm* — Leydig, Voit & Mayer, Ltd.

(57) ABSTRACT

A communication method and apparatus are provided. The method includes: a first terminal apparatus sends first information to a network device, where the first information is used to request a transmission resource, where the transmission resource is used by a second terminal apparatus and/or the first terminal apparatus for transmission, and the second terminal apparatus and the first terminal apparatus belong to a same terminal apparatus group.

20 Claims, 7 Drawing Sheets

COMMUNICATION METHOD AND APPARATUS

CROSS-REFERENCE TO RELATED APPLICATIONS

This application a continuation of International Application No. PCT/CN2019/121865, filed on Nov. 29, 2019, which claims priority to Chinese Patent Application No. 201811444611.X, filed on Nov. 29, 2018. The disclosures of the aforementioned applications are hereby incorporated by reference in their entireties.

TECHNICAL FIELD

Embodiments of this application relate to the field of mobile communications technologies, and in particular, to a communication method and apparatus.

BACKGROUND

Currently, new radio (NR) proposes a solution in which a terminal assists a base station in allocating a resource to another terminal. The base station may indicate, to one terminal (referred to as a head terminal below) of a plurality of terminals, a resource that needs to be allocated to the plurality of terminals, and then the head terminal indicates the resource to another terminal.

However, there is currently no clear and detailed solution in which the head terminal assists the base station in resource allocation. Therefore, currently efficiency of resource allocation is low.

SUMMARY

This application provides a communication method and apparatus, to resolve a technical problem that currently efficiency is low when a head terminal assists a base station in resource allocation.

According to a first aspect, this application provides a communication method. When the method is implemented by a first terminal apparatus, the first terminal apparatus sends first information to a network device, where the first information is used to request a transmission resource, where the transmission resource is used by a second terminal apparatus and/or the first terminal apparatus for transmission, and the second terminal apparatus and the first terminal apparatus belong to a same terminal apparatus group.

According to the foregoing solution, the first terminal apparatus requests the transmission resource for the first terminal apparatus and/or the second terminal apparatus in the terminal apparatus group, and the network device may allocate the transmission resource based on the first information, to improve efficiency of a resource request process, and reduce a signaling overhead.

In a possible design, the first information includes information used to indicate that the transmission resource is used only by the first terminal apparatus for transmission; or the first information includes information used to indicate that the transmission resource is used only by the second terminal apparatus for transmission; or the first information includes information used to indicate that the transmission resource is used by the second terminal apparatus and the first terminal apparatus for transmission.

In a possible design, the first terminal apparatus may further receive second information sent by the network device, where the second information includes information about a first transmission resource, and the first transmission resource is used by the first terminal apparatus and/or the second terminal apparatus for transmission.

In a possible design, the second information further includes information used to indicate that the first transmission resource is used only by the first terminal apparatus for transmission.

In a possible design, the second information further includes information used to indicate that the first transmission resource is used only by the second terminal apparatus for transmission, and the method further includes: sending, by the first terminal apparatus, third information to the second terminal apparatus, where the third information includes information about a fourth transmission resource, the fourth transmission resource is used by the second terminal apparatus for transmission, and the first transmission resource includes the fourth transmission resource; or sending, by the first terminal apparatus, third information to the second terminal apparatus and a third terminal apparatus, where the third information includes information about a fourth transmission resource, the fourth transmission resource is used by the second terminal apparatus and the third terminal apparatus for transmission, and the first transmission resource includes the fourth transmission resource.

In a possible design, the first transmission resource is used by the second terminal apparatus and the first terminal apparatus for transmission, the second information further includes information about a second transmission resource and information used to indicate that the second transmission resource is used only by the first terminal apparatus for transmission, the first transmission resource includes the second transmission resource, and the method further includes: determining, by the first terminal apparatus, a third transmission resource based on the first transmission resource and the second transmission resource, where the third transmission resource is used by the second terminal apparatus for transmission, and the first transmission resource includes the third transmission resource; and sending, by the first terminal apparatus, third information to the second terminal apparatus, where the third information includes information about a fourth transmission resource, the fourth transmission resource is used by the second terminal apparatus for transmission, and the third transmission resource includes the fourth transmission resource; or sending, by the first terminal apparatus, third information to the second terminal apparatus and a third terminal apparatus, where the third information includes information about a fourth transmission resource, the fourth transmission resource is used by the second terminal apparatus and the third terminal apparatus for transmission, and the third transmission resource includes the fourth transmission resource.

In a possible design, the first transmission resource is used by the second terminal apparatus and the first terminal apparatus for transmission, the second information further includes information about a third transmission resource and information used to indicate that the third transmission resource is used only by the second terminal apparatus for transmission, the first transmission resource includes the third transmission resource, and the method further includes: sending, by the first terminal apparatus, third information to the second terminal apparatus, where the third information includes information about a fourth transmission resource, the fourth transmission resource is used by the second terminal apparatus for transmission, and the third transmission resource includes the fourth transmission resource; or sending, by the first terminal apparatus, third information to the second terminal apparatus and a third terminal apparatus, where the third information includes information about a fourth transmission resource, the fourth transmission resource is used by the second terminal apparatus and the third terminal apparatus for transmission, and the third transmission resource includes the fourth transmission resource.

In a possible design, the method further includes: determining, by the first terminal apparatus, a third transmission resource based on the first transmission resource, where the third transmission resource is used by the second terminal apparatus for transmission, and the first transmission resource is used by the second terminal apparatus and the first terminal apparatus for transmission; and sending, by the first terminal apparatus, third information to the second terminal apparatus, where the third information includes information about a fourth transmission resource, the fourth transmission resource is used by the second terminal apparatus for transmission, and the third transmission resource includes the fourth transmission resource; or sending, by the first terminal apparatus, third information to the second terminal apparatus and a third terminal apparatus, where the third information includes information about a fourth transmission resource, the fourth transmission resource is used by the second terminal apparatus and the third terminal apparatus for transmission, and the third transmission resource includes the fourth transmission resource.

In a possible design, the second information further includes information used to indicate that the first transmission resource is used by the second terminal apparatus and the first terminal apparatus for transmission.

In a possible design, the method further includes: receiving, by the first terminal apparatus, second information sent by the network device, where the second information includes information about a second transmission resource, information about a third transmission resource, information used to indicate that the second transmission resource is used by the first terminal apparatus for transmission, and information used to indicate that the information about the third transmission resource is used by the second terminal apparatus for transmission; and sending, by the first terminal apparatus, third information to the second terminal apparatus, where the third information includes information about a fourth transmission resource, the fourth transmission resource is used by the second terminal apparatus for transmission, and the third transmission resource includes the fourth transmission resource; or sending, by the first terminal apparatus, third information to the second terminal apparatus and a third terminal apparatus, where the third information includes information about a fourth transmission resource, the fourth transmission resource is used by the second terminal apparatus and the third terminal apparatus for transmission, and the third transmission resource includes the fourth transmission resource.

In a possible design, before that the first terminal apparatus sends first information to a network device, fourth information sent by the network device may be further received, where the fourth information includes information used to indicate that the first terminal apparatus requests the transmission resource from the network device; or the fourth information includes load information of the network device, and the load information is used to determine that the first terminal apparatus requests the transmission resource from the network device.

In a possible design, before that the first terminal apparatus sends first information to a network device, fifth information may be further sent to the second terminal apparatus, where the fifth information includes information used to indicate that the first terminal apparatus requests the transmission resource from the network device.

In a possible design, before that the first terminal apparatus sends first information to a network device, sixth information sent by the second terminal apparatus may be further received, where the sixth information is used to request to allocate a transmission resource to the second terminal apparatus.

In a possible design, before that the first terminal apparatus sends first information to a network device, it may be further determined that a preset condition is met. The preset condition includes one or more of the following conditions: the first terminal apparatus determines that duration since the last time of sending of the first information reaches preset duration; or the first terminal apparatus receives the fifth information sent by the second terminal apparatus, where the fifth information is used to request to allocate the transmission resource to the second terminal apparatus; or the first terminal apparatus determines that a quantity of second terminal apparatuses in the terminal apparatus group changes; or the first terminal apparatus determines that the second terminal apparatus changes to the first terminal apparatus; or if the terminal apparatus group is a vehicle platoon, the first terminal apparatus determines that limiting speed of the vehicle platoon changes. Therefore, efficiency of requesting the transmission resource by using the first information is further improved.

In a possible design, the first information includes a part or all of the following information: information used to indicate that the first terminal apparatus is a head terminal apparatus in the terminal apparatus group; or an identifier of the second terminal apparatus; or an identifier of the terminal apparatus group; or information used to indicate that the transmission resource is used for a group-related service; or the information used to indicate that the transmission resource is used only by the second terminal apparatus for transmission; or the information used to indicate that the transmission resource is used only by the first terminal apparatus for transmission; or the information used to indicate that the transmission resource is used by the second terminal apparatus and the first terminal apparatus for transmission; or quantity information of the second terminal apparatus and the first terminal apparatus; or information used to indicate traffic of the transmission resource; or information used to indicate a resource amount of the transmission resource; or information used to indicate a busy ratio that corresponds when a terminal apparatus in the terminal apparatus group uses a sidelink sidelink resource; or information used, when the terminal apparatus group is the vehicle platoon, to indicate the limiting speed of the vehicle platoon; or a moment of starting to use the transmission resource; or a moment of finishing using the transmission resource; or information that indicates a QoS requirement.

In addition, when the method is implemented by a first terminal apparatus, a second terminal apparatus may receive resource indication information, where the resource indication information includes information about a third transmission resource; and the resource indication information is sent by the first terminal apparatus, and the first terminal apparatus and the second terminal apparatus belong to a same terminal apparatus group; or the resource indication information is sent by a network device.

In a possible design, before receiving the resource indication information, the second terminal apparatus may further send sixth information to the first terminal apparatus, where the sixth information includes a part or all of the following information: an identifier of the second terminal apparatus; or information used to indicate that a transmission resource is used only for a group-related service; or information used to indicate traffic of the transmission resource; or information used to indicate a resource amount of the transmission resource; or a moment of starting to use the transmission resource; or a moment of finishing using the transmission resource; or the information that indicates a QoS requirement.

In a possible design, before sending the sixth information to the first terminal apparatus, the second terminal apparatus may further receive fourth information sent by the network device, where the fourth information includes information used to indicate that the first terminal apparatus requests the transmission resource from the network device; or the fourth information includes load information of the network device, and the load information is used to determine that the first terminal apparatus requests the transmission resource from the network device. Alternatively, the second terminal apparatus receives fifth information sent by the first terminal apparatus, where the fifth information includes information used to indicate that the first terminal apparatus requests the transmission resource from the network device. Therefore, the second terminal apparatus can determine, based on the fourth information sent by the network device or the fifth information sent by the first terminal apparatus, that the first terminal apparatus requests the transmission resource of the second terminal apparatus, thereby improving resource request efficiency, and reducing a signaling overhead generated when each second terminal apparatus requests a transmission resource from the network device.

When the method is implemented by a network device, the network device may receive first information, where the first information is used to request a transmission resource, where the transmission resource is used by a second terminal apparatus and/or the first terminal apparatus for transmission, and the second terminal apparatus and the first terminal apparatus belong to a same terminal apparatus group.

In a possible design, the network device may further send second information to the first terminal apparatus, where the second information includes information about a first transmission resource, and the first transmission resource is used by the first terminal apparatus and/or the second terminal apparatus for transmission.

In a possible design, the second information further includes information used to indicate that the first transmission resource is used only by the first terminal apparatus for transmission; or the second information further includes information used to indicate that the first transmission resource is used only by the second terminal apparatus for transmission; or the second information further includes information used to indicate that the first transmission resource is used by the second terminal apparatus and the first terminal apparatus for transmission.

In a possible design, the network device sends seventh information to the second terminal apparatus, where the seventh information includes information about a third transmission resource; or the network device sends seventh information to the second terminal apparatus and a third terminal apparatus, where the seventh information includes information about a third transmission resource, and the third terminal apparatus belongs to the terminal apparatus group.

In a possible design, the first transmission resource is used by the second terminal apparatus and the first terminal apparatus for transmission, the second information further includes information about a second transmission resource and information used to indicate that the second transmission resource is used only by the first terminal apparatus for transmission, and the first transmission resource includes the second transmission resource; and/or the first transmission resource is used by the second terminal apparatus and the first terminal apparatus for transmission, the second information further includes information about a third transmission resource and information used to indicate that the third transmission resource is used only by the second terminal apparatus for transmission, and the first transmission resource includes the third transmission resource.

In a possible design, the second information further includes information used to indicate that the first transmission resource is used by the second terminal apparatus and the first terminal apparatus for transmission.

In a possible design, the network device may further send second information to the first terminal apparatus, where the second information includes information about a second transmission resource, information about a third transmission resource, information used to indicate that the second transmission resource is used by the first terminal apparatus for transmission, and information used to indicate that the third transmission resource is used by the second terminal apparatus for transmission.

In a possible design, the network device may further send second information to the first terminal apparatus, and send seventh information to the second terminal apparatus, where the second information includes information about a second transmission resource, and the seventh information includes information about a third transmission resource; or the network device sends second information to the first terminal apparatus, and sends seventh information to the second terminal apparatus and a third terminal apparatus, where the seventh information includes information about a third transmission resource, and the third terminal apparatus belongs to the terminal apparatus group.

In a possible design, the network device may further determine, based on the first information, that the first terminal apparatus is a head terminal apparatus in the terminal apparatus group. Therefore, the network device allocates the transmission resource according to the communication method provided in this embodiment of this application only after determining that the first information is sent by the head terminal.

In a possible design, the first information includes an identifier used to indicate that the transmission resource is used for a group-related service, and the network device may further determine, based on the identifier, that the transmission resource is used for the group-related service. Therefore, the network device allocates the transmission resource according to the communication method provided in this embodiment of this application only after determining that the first information is used to request the transmission resource required by the group-related service.

In a possible design, the second information is further used to indicate that the first transmission resource is used for a group-related service.

In a possible design, the second information is further used to indicate that the second transmission resource is used for a group-related service.

In a possible design, the seventh information is used to indicate that the third transmission resource is used for a group-related service.

In a possible design, the network device may further send fourth information to a terminal apparatus in the terminal apparatus group before receiving the first information, where the fourth information includes information used to indicate that the first terminal apparatus requests the transmission resource from the network device; or the fourth information includes load information of the network device, and the load information is used to determine that the first terminal apparatus requests the transmission resource from the network device.

According to a second aspect, this application provides a communications apparatus. The communications apparatus may be configured to implement a function implemented by the first terminal apparatus, the second terminal apparatus, or the network device in any one of the first aspect or the possible designs of the first aspect. The function may be implemented by hardware, or may be implemented by hardware executing corresponding software. The hardware or the software includes one or more modules corresponding to the function, the method step, or the operation in the foregoing aspect and any design of the foregoing aspect.

In a possible design, the communications apparatus may include a transceiver, a memory, and a processor. The transceiver is configured to perform communication by the communications apparatus. The memory is configured to store a computer program. The processor is configured to run the computer program, to implement the function implemented by the first terminal apparatus, the second terminal apparatus, or the network device in any one of the first aspect or the possible designs of the first aspect.

According to a third aspect, an embodiment of this application provides a terminal, configured to implement a function implemented by the first terminal apparatus or the second terminal apparatus in any one of the first aspect or the possible designs of the first aspect. The terminal may include corresponding function modules, respectively configured to implement the steps in the foregoing method. The function may be implemented by hardware, or may be implemented by hardware executing corresponding software. The hardware or the software includes one or more modules corresponding to the function, the method step, or the operation in the foregoing aspect and any design of the foregoing aspect.

According to a fourth aspect, an embodiment of this application provides a network device, configured to implement a function implemented by the network device in any one of the first aspect or the possible designs of the first aspect. The network device may include corresponding function modules, respectively configured to implement the steps in the foregoing method. The function may be implemented by hardware, or may be implemented by hardware executing corresponding software. The hardware or the software includes one or more modules corresponding to the function, the method step, or the operation in the foregoing aspect and any design of the foregoing aspect.

According to a fifth aspect, an embodiment of this application provides a computer-readable storage medium, including a program instruction. When the program instruction is used on a computer, the computer is enabled to perform the method implemented by the first terminal apparatus, the second terminal apparatus, or the network device in any one of the first aspect or the possible designs of the first aspect.

According to a sixth aspect, an embodiment of this application provides a computer program product. When the computer program product runs on a computer, the computer is enabled to perform the method implemented by the first terminal apparatus, the second terminal apparatus, or the network device in any one of the first aspect or the possible designs of the first aspect.

According to a seventh aspect, an embodiment of this application provides a chip. The chip may be coupled to a memory, and may be configured to execute a program instruction in the memory, to perform the method in the first aspect and any possible design of the first aspect in embodiments of this application. "Be coupled to" means that two components are directly or indirectly combined with each other. For example, "be coupled to" may mean that the two components are electrically connected.

For technical effects brought by the second aspect to the seventh aspect, refer to the description of the first aspect. Details are not described herein again.

DESCRIPTION OF EMBODIMENTS

Figure 1:
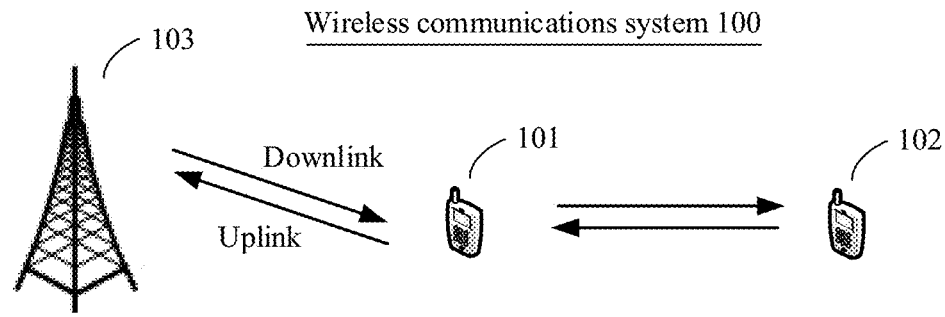
FIG. 1 is a schematic architectural diagram of a wireless communications system according to this application.

To make the objectives, technical solutions, and advantages of this application clearer, the following further describes this application in detail with reference to the accompanying drawings. A specific operation method in a method embodiment may also be applied to an apparatus embodiment or a system embodiment.

The following explains terms in this application.
1. At least one means one or more, that is, including one, two, three, or more.
2. A plurality of means two or more, that is, including two, three, or more.
3. Carrying may mean that a message is used to carry information or data, or may mean that a message includes information.
4. A sidelink is used for device-to-device (D2D) communication between terminals.
5. A terminal apparatus group in this application refers to a set of a plurality of terminal apparatuses configured to perform a group-related service. For example, a plurality of terminals in one or more cells may form one terminal apparatus group, and a possible form of the terminal apparatus group is a vehicle platoon. A terminal in the terminal apparatus group may communicate with another terminal in a multicast, unicast, or broadcast manner. The terminal apparatus group has a unique group identifier (ID) that may be used to identify the terminal apparatus group.

6. Sidelink unicast means that a terminal transmits information to another terminal. Sidelink multicast means that a terminal transmits information to a plurality of terminals. Sidelink broadcast means that a terminal transmits information to all terminals within coverage of the terminal.

7. A head terminal in this application is a terminal that is specified by a core network, another network device (for example, a base station), or some terminal apparatuses in the terminal apparatus group and that is configured to collect a transmission resource requirement of another terminal in the terminal apparatus group and uniformly request a transmission resource from a network device. The transmission resource herein may be a transmission resource used to perform the group-related service. The core network may authorize, over an air interface by using higher layer signaling, a terminal in the terminal apparatus group as the head terminal.

8. The group-related service, also referred to as group communication, refers to a process in which a terminal in the terminal apparatus group communicates with one or more other terminals in a same terminal apparatus group, or may be that a terminal in the terminal apparatus group transmits information to another terminal that is not in the group. A terminal may perform the group-related service in any one or more manners of unicast, multicast, or broadcast. Group-related services may be distinguished by using identifiers of the group-related services.

The following describes embodiments of this application in detail with reference to accompanying drawings. First, wireless communications systems provided in the embodiments of this application are described. Communication methods provided in this application may be applied to the systems. Then, the communication methods provided in the embodiments of this application are described. Finally, terminals and network devices provided in the embodiments of this application are described.

As shown in FIG. 1, a wireless communications system 100 provided in an embodiment of this application includes a terminal 101, a terminal 102, and a network device 103. Application scenarios of the wireless communications system 100 include but are not limited to a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS) system, a worldwide interoperability for microwave access (WiMAX) communications system, a future 5th generation (5G) system, a new radio (NR) communications system, an NR vehicle to everything (V2X) system, a future mobile communications-based internet of vehicles system, or the like. It should be understood that the wireless communications system 100 provided in this embodiment of this application is applicable to both a low-frequency scenario (sub 6G) and a high-frequency scenario (above 6G).

For example, the terminal 101 and the terminal 102 each may be a device such as a terminal, a mobile station (MS), and a mobile terminal, or an apparatus such as a chip and a chip system. The terminal 101 can communicate with one or more network devices in one or more communications systems, and accepts a network service provided by the network device. The network device herein includes but is not limited to the network device 103 shown in the figure. For example, in this embodiment of this application, the terminal 101 and the terminal 102 each may be a mobile phone (or referred to as a "cellular" phone) or a computer having a mobile terminal. Alternatively, the terminal 101 and the terminal 102 each may be a portable, pocket-sized, handheld, computer built-in, or in-vehicle mobile apparatus. Alternatively, the terminal 101 and the terminal 102 each may be a communications chip having a communications module. It should be understood that the terminal 101 may be configured to support communication with the network device 103 over a universal user to network interface (Uu interface), and/or the terminal 101 and the terminal 102 may be configured to support sidelink transmission. For example, the terminal 101 and the terminal 102 may perform sidelink communication over a direct communication (PC5) interface (namely, an air interface used for sidelink communication between terminals).

The network device 103 may include a base station (BS), or include a base station, a radio resource management device configured to control the base station, and the like. The base station herein may be a base transceiver station (BTS) in a GSM or CDMA system, or may be a NodeB (NB) in a WCDMA system, or may be an evolved NodeB (Evolutional NodeB, eNB or eNodeB), a micro/pico eNB, or a transmission reception point (TRP) in an LTE system, or may be a radio controller in a cloud radio access network (CRAN) scenario. Alternatively, the base station may be a relay station, an access point, a vehicle-mounted device, a wearable device, a base station in a future 5G network, a base station in a future evolved PLMN network, or the like, for example, an NR base station. This is not limited in this embodiment of this application.

Figure 2:
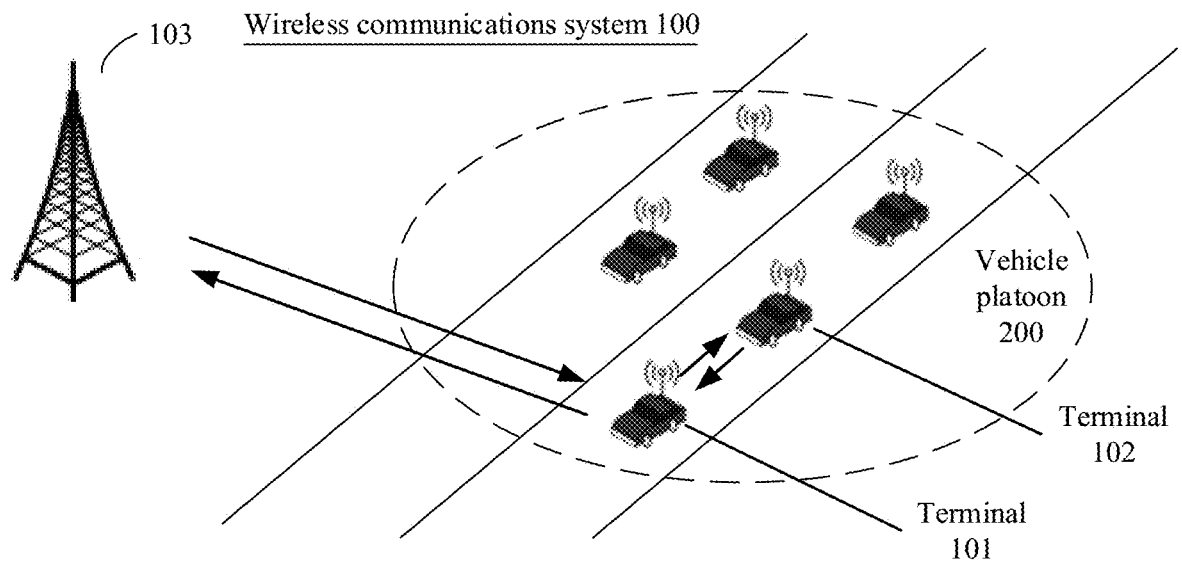
FIG. 2 is a schematic architectural diagram of another wireless communications system according to this application.

The following uses a V2X scenario shown in FIG. 2 as an example to further describe an application scenario of a wireless communications system 100 provided in an embodiment of this application.

As shown in FIG. 2, the wireless communications system 100 is applicable to a wireless communications system including a vehicle platoon 200. The vehicle platoon 200 includes a plurality of terminals (for example, in-vehicle mobile apparatuses). The vehicle platoon 200 may be a terminal apparatus group. A terminal 101 is a head terminal in the vehicle platoon 200, and a terminal 102 is a terminal other than the head terminal in the vehicle platoon 200. Therefore, in this application, the terminal 101 may request a transmission resource from a network device 103, and the transmission resource may be used by the terminal 101 and/or another terminal in the vehicle platoon 200 to perform a group-related service. The another terminal in the vehicle platoon 200 may send assistance information to the terminal 101. For example, the terminal 102 shown in FIG. 2 may send a requirement of the terminal 102 for a transmission resource to the terminal 101, so that the terminal 101 requests the transmission resource from the network device 103 based on the requirement of the terminal 102 for the transmission resource.

It should be understood that the methods provided in the embodiments of this application may be applied to a transmission resource allocation scenario of a terminal apparatus group. The method may alternatively be applied to a transmission resource allocation scenario of a vehicle platoon.

Figure 3:
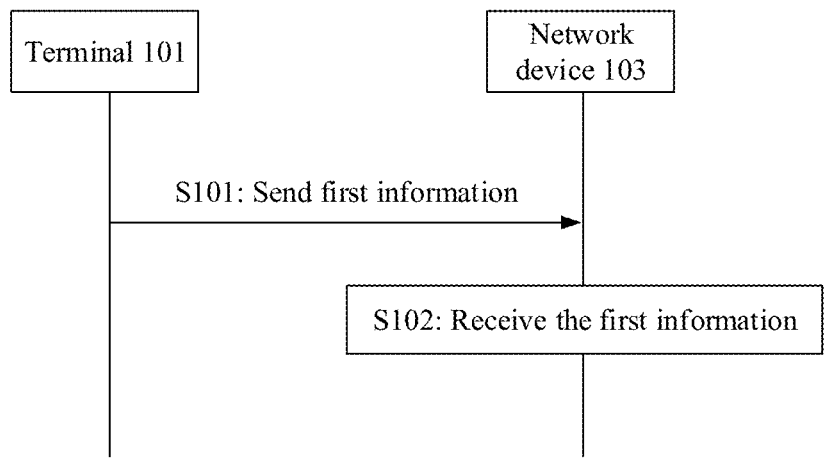
FIG. 3 is a schematic flowchart of a communication method according to this application.

With reference to FIG. 3, the following uses the wireless communications system 100 shown in FIG. 2 as an example to describe a communication method provided in an embodiment of this application. The terminal 101 is the head terminal in the vehicle platoon 200, and the terminal 102 is a non-head terminal in the vehicle platoon 200. The communication method may include the following steps.

S101: The terminal 101 sends first information to the network device 103, where the first information is used to request a transmission resource, the transmission resource is used by at least one terminal 102 and/or the terminal 101 for transmission, and the terminal 101 and the terminal 102 are in a same terminal apparatus group.

S102: The network device 103 receives the first information sent by the terminal 101.

According to the foregoing method, the terminal 101 requests the transmission resource for the terminal 102 and/or the terminal 101 in the terminal apparatus group. The method may be applied to a scenario such as a group-related service of a member in the terminal apparatus group, to improve efficiency of a resource request process, and reduce a signaling overhead.

It should be understood that, in the steps shown in FIG. 3, the terminal 101 is the head terminal in the vehicle platoon 200. For example, before step S101, the terminal 101 may become the head terminal in the vehicle platoon 200 based on authorization of a core network. The core network may select the head terminal from the vehicle platoon 200 by considering a part or all of information such as location information, path loss information, and signal strength of each terminal in the vehicle platoon 200, and a remaining oil amount or a remaining electricity amount of a vehicle in which the terminal is located.

The first information in this application may be used to request the transmission resource. For example, the first information may carry information used to indicate that the transmission resource is used only by the terminal 101 for transmission, carry information used to indicate that the transmission resource is used only by the at least one terminal 102 for transmission, or carry information used to indicate that the transmission resource is used by the at least one terminal 102 and the terminal 101 for transmission, to make clear terminals in the vehicle platoon 200 that use the transmission resource.

In a possible implementation, the first information sent by the terminal 101 may specifically include a part or all of the following information.

Information used to indicate that the terminal 101 is the head terminal in the terminal apparatus group to which the terminal 101 belongs. The terminal 101 may use the first message sent to the network device 103 to carry the information. The information may be used by the network device 103 to determine whether received resource request information (for example, the first information or other resource request information received by the network device 103) is from the head terminal in the terminal apparatus group. If the network device 103 stores an identifier of a terminal authorized as the head terminal, the network device 103 may directly determine, depending on whether the identifier of the terminal authorized as the head terminal includes an identifier of the terminal 101 (where the network device 103 and the terminal 101 are in connected mode, and therefore, the network device 103 may obtain the identifier of the terminal 101 that sends the first information), whether the terminal 101 is the head terminal. If the network device 103 does not store an identifier of a terminal authorized as the head terminal, determining may be performed based on the information. For example, the information may be represented by using one bit. For example, a bit in the first information is set to 0 (or 1), to indicate that the first information is sent by the head terminal in the terminal apparatus group. Based on different results of the determining, the network device 103 may perform different operations based on the resource request information. For example, if the network device 103 determines that the resource request information (for example, the first information in this application) is from the head terminal, the network device 103 may allocate the resource for the head terminal (for example, the terminal 101 in the vehicle platoon 200) in the terminal apparatus group and/or the non-head terminal (for example, the terminal 102 in the vehicle platoon 200) in the terminal apparatus group based on the first information. If the network device 103 determines that the resource request information is not from the head terminal, but from the non-head terminal in the terminal apparatus group, the network device 103 considers allocating the transmission resource only to the terminal based on the resource request information, and does not allocate the transmission resource to another terminal in the terminal apparatus group to which the terminal belongs. When allocating the transmission resource, the network device 103 may further consider a status of a transmission resource that has been currently allocated to the another terminal in the terminal apparatus group. For example, a relatively large amount of transmission resource has been allocated to the another terminal in the terminal apparatus group, and the transmission resource is still available. In this case, the network device 103 may properly reduce, based on the resource request information, a transmission resource to be allocated to the terminal, to avoid the terminals in the terminal apparatus group excessively occupying a transmission resource. If the network device 103 determines that the resource request information is not from a terminal in the terminal apparatus group, the network device 103 may consider allocating the transmission resource to the terminal based on the resource request information.

An identifier of a second terminal apparatus. When the first information sent by the terminal 101 to the network device 103 is used to request a transmission resource of the at least one terminal 102, the first information may be used to carry an identifier (UE ID) of the at least one terminal 102, to indicate that the requested transmission resource is used by the at least one terminal 102.

An identifier of the terminal apparatus group, for example, an identifier of the terminal apparatus group of the vehicle platoon 200 in which the terminal 101 is located. The identifier may be further used by the network device 103 to determine whether the received resource request information is from the terminal in the terminal apparatus group. Based on different results of the determining, the network device 103 may perform the different operations based on the resource request information. For details, refer to a description of an identifier information of a first terminal apparatus. In addition, the identifier may be further used by the network device 103 to determine whether the transmission resource has been allocated to the terminal in the terminal apparatus group to which the terminal (the terminal 101 or the terminal 102) that sends the first information belongs. If the network device 103 has allocated a relatively large amount of transmission resource to the terminal in the terminal apparatus group having the identifier, the network device 103 may consider properly reducing an amount of a to-be-allocated transmission resource based on the transmission resource requested by using the first information.

Information used to indicate that the transmission resource is used only for a group-related service. The network device 103 may determine, based on the information, that the transmission resource requested by using the first information is used to transmit only the group-related service. For example, a specific bit in the first information may be used to represent the information. For example, the specific bit in the first information may be set to 0 (or 1), to indicate that the transmission resource requested by using the first information is used to transmit only the group-related service. Alternatively, the information may be the identifier of the terminal apparatus group of the vehicle platoon 200, namely, the identifier of the terminal apparatus group to which the terminal 101 belongs. When the first information includes the identifier, it indicates that the resource requested by using the first information is used for the group-related service. If the first information does not include the identifier, it indicates that the resource requested by using the first information is not used for the group-related service. In addition, the information may alternatively be an identifier of the group-related service performed by the terminal 101 and/or the at least one terminal 102 to request the transmission resource. In this case, after determining that the first information carries the identifier of the group-related service, the network device 103 may determine that the transmission resource requested by using the first information is used to transmit only the group-related service.

Information used to indicate that the transmission resource requested by using the first information is used only by the terminal 101 for transmission, information used to indicate that the transmission resource is used only by the at least one terminal 102 for transmission, or information used to indicate that the transmission resource is used by the terminal 101 and the at least one terminal 102 for transmission. The network device 103 may determine, based on the foregoing information, a terminal or terminals to which the transmission resource requested by using the first information is allocated. For example, the foregoing information may be represented by using two bits in the first information. For example, two specific bits in the first information may be set to 00, to indicate that the transmission resource requested by using the first information is used only by the terminal 101 for transmission; two specific bits in the first information are set to 01, to indicate that the transmission resource requested by using the first information is used only by the at least one terminal 102 for transmission; two specific bits in the first information are set to 10, to indicate that the transmission resource requested by using the first information is used by the terminal 101 and the at least one terminal 102 for transmission. It should be understood that, in this application, the foregoing information may alternatively be carried in the first information in another manner. This is not specifically limited in this application.

Quantity information of the at least one terminal 102 and/or the terminal 101 apparatus. The first information may further carry information about a quantity of terminals that request a transmission resource. For example, when the transmission resource is used only by the terminal 101 for transmission, the first information may carry information used to indicate that the quantity of terminals that are to use the transmission resource is 1.

Information used to indicate traffic of the transmission resource and/or information used to indicate a resource amount of the transmission resource. The information about the traffic of the transmission resource and the information about the resource amount of the transmission resource are related to a feature of a service executed by the terminal 101 and/or the at least one terminal 102 and/or a channel condition. The information about the traffic of the transmission resource may indicate a resource required for transmitting specific traffic. A unit of the traffic of the transmission resource may be bits/second (bits/s), and the traffic of the transmission resource may be used to represent a quantity of bits transmitted per second on the requested transmission resource. The resource amount of the transmission resource may be used to represent a time-frequency resource location or/and a size of the requested transmission resource.

Information used to indicate a busy ratio that corresponds when the terminal apparatus in the terminal apparatus group uses a sidelink resource. The information may be used to represent whether a resource amount required by the terminal in the current terminal apparatus group (for example, the terminal apparatus group shown in the vehicle platoon 200) is proper relative to an available sidelink resource. When the busy ratio represented by the information is relatively high, it indicates that the resource amount required by the terminal in the vehicle platoon 200 is excessive relative to the available sidelink resource, and the network device 103 needs to allocate a larger amount of transmission resource or a transmission resource with relatively good transmission quality. On the contrary, it indicates that the resource amount required by the terminal in the vehicle platoon 200 is not excessive relative to the available sidelink resource.

Information used, when the terminal apparatus group is the vehicle platoon, to indicate limiting speed of the vehicle platoon. Generally, speed of different terminals in a same vehicle platoon should be the same. If another condition remains unchanged, an increase in vehicle limiting speed causes a higher quality of service (QoS) requirement for the group-related service between the terminals in the vehicle platoon, thereby increasing a requirement for the transmission resource.

A moment of starting to use the transmission resource and/or a moment of finishing using the transmission resource. When the transmission resource is requested by using the head terminal in the terminal apparatus group, the transmission resource requested by the terminal 101 may be used for transmission at a future time point. The foregoing information may be used by the network device 103 to determine when the terminal 101 and/or the at least one terminal 102 start/starts to use the transmission resource, and/or determine when the terminal 101 and/or the at least one terminal 102 finish/finishes using the transmission resource. Therefore, the network device 103 can allocate the transmission resource more effectively.

Information that indicates a QoS requirement. The information that indicates the QoS requirement may represent a requirement for a transmission delay, a requirement for a size of a to-be-transmitted data packet, a requirement for a transmission data rate, or the like. The network device 103 may allocate a proper transmission resource to the terminal 101 and/or the at least one terminal 102 based on the information that indicates the QoS requirement and that is included in the first information.

In a possible implementation, the terminal 101 may further send the first information after determining that a preset condition is met. For example, the preset condition meets one or more of the following conditions.

Condition 1: The terminal 101 determines that duration since the last time of sending of the first information reaches preset duration. A transmission resource allocated by the network device 103 has a time limitation. When the time limitation expires, the transmission resource allocated by the network device 103 is unavailable. Therefore, to improve communication quality of the terminal in the vehicle platoon 200, the terminal 101 may send the first information again after the preset duration after sending the first information, thereby prolonging or re-requesting the network device 103 to allocate the transmission resource.

Condition 2: The terminal 101 receives resource request information sent by the at least one terminal 102. The resource request information herein includes but is not limited to sixth information in this application. In this application, the terminal 102 may send the sixth information to the terminal 101, to request to allocate a transmission resource to the terminal 102. After receiving the sixth information sent by another terminal 102 in the vehicle platoon 200, the terminal 101 may send the first information to the network device 103, to request the network device 103 to allocate the transmission resource to the terminal 102.

Condition 3: The terminal 101 determines that a quantity of terminals 102 in the terminal apparatus group changes. When a quantity of terminals in the vehicle platoon 200 changes, a transmission resource may be reallocated to the terminals in the vehicle platoon 200. In this case, the terminal 101 may send the first information to the network device 103.

Condition 4: The terminal 101 determines that the terminal 101 is authorized as the head terminal. When authorized as the head terminal, the terminal 101 may send the first information to the network device 103, to request the network device 103 to allocate the transmission resource to the vehicle platoon 200.

Condition 5: The terminal 101 determines that the limiting speed of the vehicle platoon 200 changes. As described above, the limiting speed of the vehicle platoon 200 affects a QoS requirement of the terminal in the vehicle platoon 200 for the transmission resource. Therefore, after the limiting speed of the vehicle platoon 200 changes, the terminal 101 may request the network device 103 to reallocate the transmission resource, to match a requirement of the changed limiting speed for the transmission resource.

After receiving the first information, the network device 103 may allocate the transmission resource to the at least one terminal 102 and/or the terminal 101 based on the first information, and the transmission resource is indicated to the at least one terminal 102 and/or the terminal 101 by using resource indication information (where the information may carry information about the transmission resource to indicate the transmission resource, and the information includes but is not limited to resource indication information such as second information, third information, and seventh information in this application), thereby allocating the transmission resource. For example, the network device 103 may send the second information to the terminal 101, where the second information carries information about a first transmission resource to indicate the first transmission resource. The terminal 101 may determine, based on the first transmission resource indicated by the second information, a second transmission resource that can be used by the terminal 101 for transmission, and/or a third transmission resource that can be used by the at least one terminal 102 for transmission, and send the third information to the at least one terminal 102. The third information may carry information about the third transmission resource to indicate the third transmission resource.

It should be understood that a form of the transmission resource allocated by the network device 103 is a resource pool. In addition, the resource or the resource pool allocated by the network device 103 in this application may belong to a bandwidth part (BWP). Each BWP may belong to a carrier in a frequency band.

In addition, the network device 103 may alternatively send the resource indication information to the at least one terminal 102, thereby indicating, to the at least one terminal 102 without using the terminal 101, the transmission resource used by the at least one terminal 102 for transmission. It should be understood that the network device 103 may allocate a transmission resource exclusively used by the terminal 102 to each terminal 102, and use the resource indication information sent to the terminal 102 to carry information about the transmission resource allocated to each terminal 102. Alternatively, the network device 103 may use the resource indication information sent to the plurality of terminals 102 to carry information about a same transmission resource, to indicate a same transmission resource to the plurality of terminals 102, so that the terminals 102 share the transmission resource.

For example, if the transmission resource is used by the plurality of terminals 102 for transmission, when transmission resource information carrying the information about the transmission resource is sent to the plurality of terminals 102, the network device 103 or the terminal 101 may send the transmission resource information to the plurality of terminals 102, and the plurality of terminals 102 may share, in a manner such as contention-based use, polling-based use, or random use, the transmission resource or a transmission resource set indicated by the transmission resource information. The transmission resource information may be sent to the plurality of terminals 102 through multicast, or the transmission resource information may be separately sent to the plurality of terminals 102 in a unicast manner. It should be understood that the transmission resource information herein includes but is not limited to the second information sent by the terminal 101 to the terminal 102 and the first information or the seventh information sent by the network device 103 to the terminal 102 in this embodiment of this application.

In addition, during implementation, the terminal 101 may alternatively allocate, to the terminal 102 based on the information about the transmission resource indicated by the network device 103, the transmission resource exclusively used by the terminal 102. For example, the terminal 101 may determine, based on the transmission resource indicated by the network device 103, a transmission resource exclusively used by each of the plurality of terminals 102. The transmission resource exclusively used by each of the plurality of terminals 102 may be included in the transmission resource indicated by the network device 103. In an implementation, the terminal 101 may allocate the transmission resource to the terminal 102 based on information about a requirement of each terminal 102 for the transmission resource.

In this application, the network device 103 may send the resource indication information to the terminal 101 and/or the at least one terminal 102 by using an RRC message, a MAC message, a physical layer signal (for example, downlink control information (DCI)), or the like.

It should be understood that the resource indication information may be further used to indicate that the transmission resource is used only for the group-related service. For example, the network device 103 may use the second information sent to the terminal 101 to carry information used to indicate that the first transmission resource is used only for the group-related service. For a specific manner, refer to a manner of using the first information to carry the information used to indicate that the transmission resource is used only for the group-related service. For another example, when the network device 103 indicates the first transmission resource by using the DCI, the network device 103 may further scramble the DCI by using the ID of the terminal apparatus group, to indicate that the first transmission resource indicated by the DCI is only used to perform the group-related service.

It should be understood that before step S101 is performed, the terminal 101 and another terminal in the vehicle platoon 200 may further determine that the terminal 101 requests, from the network device 103, the transmission resource used by the at least one terminal 102 and/or the terminal 101 for transmission.

For example, in a feasible implementation, the network device 103 may send fourth information to the terminal 101 and/or the at least one terminal 102 in the vehicle platoon 200. The fourth information may carry information used to indicate that the terminal 101 requests the transmission resource from the network device 103. After receiving the fourth information, the terminal in the vehicle platoon 200 may determine that the terminal 101 requests, from the network device 103, the transmission resource used by the at least one terminal 102 and/or the terminal 101 for transmission.

Alternatively, the fourth information may include load information of the network device 103. The load information may be used to represent current access load of the network device 103. After receiving the fourth information, the terminal in the vehicle platoon 200 may determine, based on the load information of the network device 103, whether the terminal 101 requests the transmission resource from the network device 103. For example, if determining that the access load of the network device 103 is relatively high (for example, higher than or not lower than a preset load threshold), the terminal determines that the terminal 101 uniformly requests the transmission resource from the network device 103, to reduce the access load of the network device 103. If determining that access load of the network device 103 is relatively low (for example, lower than or not higher than a preset load threshold), the terminal determines that the terminal 101 does not uniformly request the transmission resource from the network device 103. In this case, the terminals in the vehicle platoon 200 may separately request the transmission resource from the network device 103.

In a feasible implementation, the terminal 101 may send fifth information to the another terminal 102 in the vehicle platoon 200. The fifth information may carry information used to indicate that the terminal 101 requests the transmission resource from the network device 103. After receiving the fifth information, the another terminal 102 may determine that the terminal 101 requests the transmission resource from the network device 103.

For example, the terminal 102 in the vehicle platoon 200 may further send the sixth information to the terminal 101. The sixth information is used to request to allocate a transmission resource to the terminal 102, and the sixth information may further indicate that the transmission resource is used only for the group-related service (for example, the sixth information carries information used to indicate that the transmission resource requested by the terminal 102 is used only for the group-related service). It should be understood that the terminal 102 may send the sixth information to the terminal 101 after determining that the terminal 101 requests the transmission resource from the network device 103.

The sixth information may further carry the identifier of the terminal 102, or carry the information about the requirement of the terminal 102 for the transmission resource, for example, a part or all of information such as a moment at which the terminal 102 starts to use the transmission resource, a moment at which the terminal 102 finishes using the transmission resource, traffic or a resource amount that is estimated by the terminal 102 and that is required for communication, or the QoS requirement. After receiving the sixth information, the terminal 101 may further use the first information to carry the identifier of the terminal 102 and/or the information about the requirement of the terminal 102 for the transmission resource, and send the first information to the network device 103, where the first information is used by the network device 103 to allocate the transmission resource.

In this application, after receiving the resource indication information that includes the information about the transmission resource, the terminal 101 and/or the terminal 102 may further send an activation request to the network device 103. The activation request may carry information used to request to activate the transmission resource. Correspondingly, after receiving the activation request, the network device 103 may activate the transmission resource and feed back a response message. In this manner, after allocating the transmission resource, the network device 103 may temporarily not activate the transmission resource until receiving the activation request sent by the terminal, and activate the transmission resource based on the activation request, to avoid a waste of the transmission resource. For example, after receiving the second information sent by the network device 103 and determining the second transmission resource used by the terminal 101 for transmission, the terminal 101 may send the activation request to the network device 103, to request to activate the second transmission resource.

The following uses the wireless communications system 100 shown in FIG. 2 as an example to separately describe, with reference to accompanying drawings, specific methods for requesting, by the terminal 101, the transmission resource from the network device 103 and allocating, by the network device 103, the transmission resource.

Manner 1: The transmission resource requested by the terminal 101 from the network device 103 is used only by the terminal 101 for transmission.

In step S101, the terminal 101 may use the first information to carry the information used to indicate that the transmission resource is used only by the terminal 101 for transmission, so that after receiving the first information in step S102, the network device 103 may determine, based on the information carried in the first information, that the transmission resource requested by the terminal 101 from the network device 103 by using the first information is used only by the terminal 101 for transmission, but is not used by the terminal 102 for transmission. Herein, the information used to indicate that the transmission resource is used only by the terminal 101 for transmission may be carried in two bits in the first information. For example, two specific bits in the first information carry a value 00, to indicate that the transmission resource requested by using the first information is used only by the terminal 101 for transmission. It should be understood that, in this application, that the transmission resource is used only by the terminal 101 for transmission may alternatively be indicated by using the first information in another manner. This is not specifically limited in this application.

Optionally, based on this, after receiving the first information, the network device 103 may determine that the transmission resource requested by using the first information is used only by the terminal 101 for transmission, allocate the first transmission resource, use the second information to carry the information about the first transmission resource, and send the second information to the terminal 101. If the terminal 101 requests, from the network device 103 by using only the first information, the transmission resource used by the terminal 101 for transmission, after receiving the second information, the terminal 101 may use the first transmission resource indicated by the second information as the transmission resource used by the terminal 101 for transmission, and further use the first transmission resource for transmission performed by the terminal 101.

It should be understood that the network device 103 may further indicate, to the terminal 101 by using the second information, that the first transmission resource is used only by the terminal 101 for transmission. For example, the network device 103 may use the second information to carry information used to indicate that the first transmission resource is used only by the terminal 101 for transmission. For example, two specific bits in the second information carry a value 00, to indicate that the first transmission resource indicated by the second information is used only by the terminal 101 for transmission.

In addition, during implementation, the network device 103 may further indicate, by using the second information, that the first transmission resource is used only for the group-related service. For example, the network device 103 may use the second information to carry the information used to indicate that the first transmission resource is used only for the group-related service. For a specific manner, refer to a manner of using the first information to carry the information used to indicate that the transmission resource is used only for the group-related service.

Figure 4:
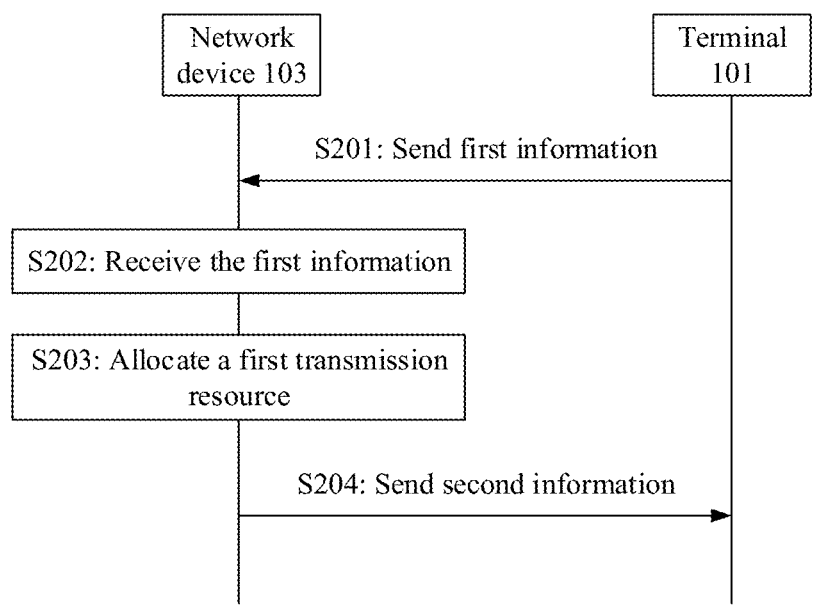
FIG. 4 is a schematic flowchart of a communication method according to this application.

As shown in FIG. 4, in a communication method provided in an embodiment of this application, if the transmission resource requested by the terminal 101 is used only by the terminal 101 for transmission, a process in which the terminal 101 requests the transmission resource from the network device 103 may include the following steps.

S201: The terminal 101 sends first information to the network device 103, where the first information is used to request the transmission resource. During implementation, the first information may carry information used to indicate that the transmission resource is used only by the terminal 101 for transmission, and/or carry information used to indicate that the transmission resource is used only for the group-related service.

S202: The network device 103 receives the first information. During implementation of S202, if the network device 103 stores a terminal identifier of the head terminal, the network device 103 may determine, based on an identifier of the terminal 101, that the first information is from the head terminal. Alternatively, the network device 103 may determine, based on information that is in the first information and that is used to indicate that the terminal 101 is the head terminal in the terminal apparatus group to which the terminal 101 belongs, that the first information is from the head terminal.

S203: The network device 103 determines a first transmission resource.

S204: The network device 103 sends second information to the terminal 101, where the second information carries information about the first transmission resource. During implementation, the second information may further carry information used to indicate that the first transmission resource is used only by the terminal 101 for transmission, and/or carry information used to indicate that the first transmission resource is used only for the group-related service.

Manner 2: The transmission resource requested by the terminal 101 from the network device 103 is used only by the at least one terminal 102 for transmission.

Before step S101, the terminal 101 may receive the sixth information sent by the at least one terminal 102, where the sixth information is used to request to allocate the transmission resource to the at least one terminal 102. In step S101, the terminal 101 may use the first information to carry the information used to indicate that the transmission resource is used only by the at least one terminal 102 for transmission, so that after receiving the first information in step S102, the network device 103 may determine, based on the information carried in the first information, that the transmission resource requested by the terminal 101 from the network device 103 by using the first information is used only by the at least one terminal 102 for transmission, but is not used by the terminal 101 for transmission. Two specific bits in the first information may be set to 01, to indicate that the transmission resource requested by using the first information is used only by the at least one terminal 102 for transmission.

In a possible implementation, after receiving the first information, the network device 103 may indicate, through assistance of the terminal 101, the transmission resource to the at least one terminal 102 after determining that the transmission resource requested by the terminal 101 by using the first information is used only by the at least one terminal 102 for transmission. For example, the network device 103 may allocate the first transmission resource, use the second information to carry the information about the first transmission resource, and send the second information to the terminal 101.

If the terminal 101 requests, from the network device 103 by using only the first information, a transmission resource used by the at least one terminal 102, after receiving the second information, the terminal 101 may use the first transmission resource indicated by the second information as the transmission resource used by the at least one terminal 102 for transmission, and may indicate the first transmission resource to the at least one terminal 102 by using the third information. For example, the information about the first transmission resource is carried in the third information.

The terminal 101 may further send the third information to the plurality of terminals 102, where each piece of third information carries the information about the first transmission resource, so that the first transmission resource can be indicated to the plurality of terminals 102 for sharing. The plurality of terminals 102 may share the first transmission resource in a manner such as contention-based use, polling-based use, or random use. For example, the terminal 101 may send the third information to the plurality of terminals 102 through multicast in the terminal apparatus group, or the terminal 101 may separately send the third information to the plurality of terminals 102 in a unicast manner.

Optionally, the network device 103 may further indicate, to the terminal 101 by using the second information, that the first transmission resource is used only by the at least one terminal 102 for transmission. For example, the network device 103 may use the second information to carry information used to indicate that the first transmission resource is used only by the terminal 101 for transmission. For example, two specific bits in the second information are set to 01, to indicate that the first transmission resource indicated by the second information is used only by the at least one terminal 102 for transmission. During implementation, the third information sent by the terminal 101 to the at least one terminal 102 may also be used to indicate that the first transmission resource is used only by the at least one terminal 102 for transmission. For a setting manner of the third information, refer to a setting manner of the second information.

In addition, during implementation, the network device 103 may further indicate, by using the second information, that the first transmission resource is used only for the group-related service. For a specific manner of the indication, refer to the description in the manner 1. During implementation, the third information sent by the terminal 101 to the at least one terminal 102 may alternatively be used to indicate that the first transmission resource is used only for a group-related service. For a specific manner of the indication, refer to the description in the manner 1.

Figure 5:
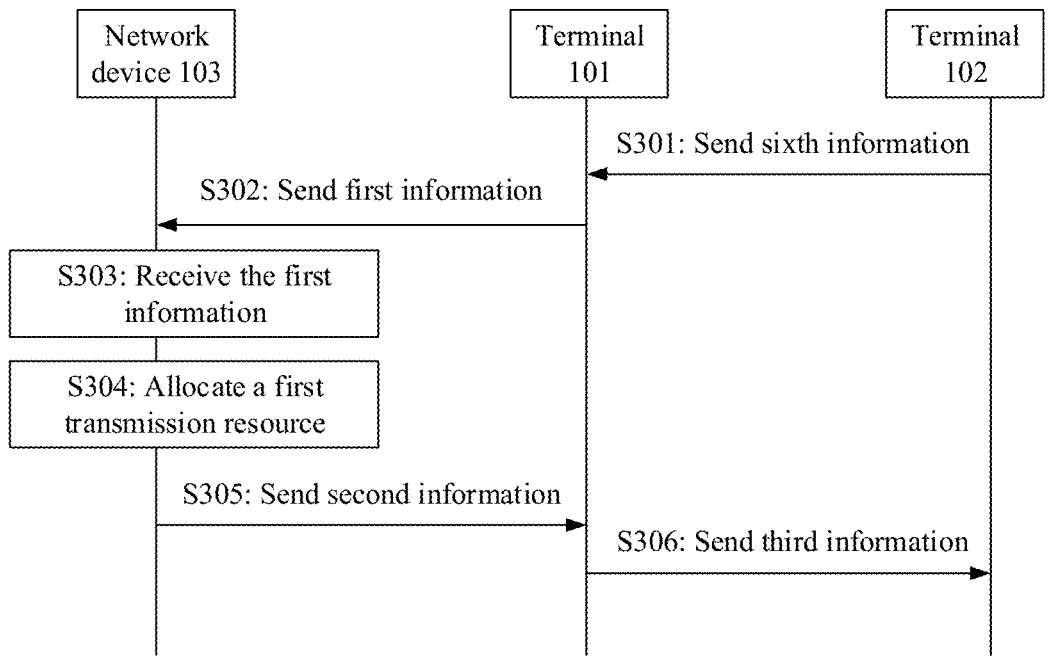
FIG. 5 is a schematic flowchart of a communication method according to this application.

As shown in FIG. 5, in a communication method provided in an embodiment of this application, if the transmission resource requested by the terminal 101 is used only by the terminal 102 for transmission, a process in which the terminal 101 requests the transmission resource from the network device 103 may include the following steps.

S301: The terminal 101 receives sixth information sent by the terminal 102, where the sixth information is used to request to allocate the transmission resource to the terminal 102. During implementation, the sixth information may include a part or all of information in an identifier of the terminal 102, information used to indicate that the transmission resource is used only for the group-related service, or the information about the requirement of the terminal 102 for the transmission resource. Before sending the sixth information, the terminal 102 may further determine that the terminal 101 requests, from the network device 103, a transmission resource used by the terminal 102 for transmission.

S302: The terminal 101 sends first information to the network device 103, where the first information is used to request the transmission resource, and the first information carries information used to indicate that the transmission resource is used only by the terminal 102 for transmission. During implementation, the first information may further include a part or all of information in information used to indicate that the terminal 101 is the head terminal in the terminal apparatus group to which the terminal 101 belongs, the identifier of the terminal 102, the information used to indicate that the transmission resource is used only for the group-related service, or the information about the requirement of the terminal 102 for the transmission resource.

S303: The network device 103 receives the first information. During implementation of S303, if the network device 103 stores a terminal identifier of the head terminal, the network device 103 may determine, based on an identifier of the terminal 101, that the first information is from the head terminal. Alternatively, the network device 103 may determine, based on information that is in the first information and that is used to indicate that the terminal 101 is the head terminal in the terminal apparatus group to which the terminal 101 belongs, that the first information is from the head terminal.

S304: The network device 103 determines a first transmission resource.

S305: The network device 103 sends second information to the terminal 101, where the second information carries information about the first transmission resource and information used to indicate that the first transmission resource is used only by the terminal 102 for transmission, and the second information may further include information used to indicate that the first transmission resource is used only for the group-related service.

S306: The terminal 101 sends third information to the terminal 102, where the third information carries the information about the first transmission resource, and the third information may further carry the information that indicates that the first transmission resource is used only by the terminal 102 for transmission and/or the information used to indicate that the first transmission resource is used only for the group-related service.

Specifically, in step S306, the terminal 101 may send the third information to one terminal 102, thereby indicating the first transmission resource to the terminal 102, and the terminal 102 exclusively uses the transmission resource. The terminal 101 may alternatively send the third information to a plurality of terminals 102 in the terminal apparatus group shown in the vehicle platoon 200, where each piece of third information carries the information about the first transmission resource, so that the terminal 101 can indicate the first transmission resource to the plurality of terminals 102, and the plurality of terminals 102 share the transmission resource. The plurality of terminals 102 may share the first transmission resource in a manner such as contention-based use, polling-based use, or random use.

It should be understood that, during implementation of this application, the terminal 101 may alternatively allocate, to each terminal 102 based on the first transmission resource, a transmission resource exclusively used by the terminal. For example, the terminal 101 allocates a part of the first transmission resource to one of the at least one terminal 102 based on information about a requirement of each of the at least one terminal 102 for the transmission resource, and sends the third information including information about the transmission resource to the terminal 102. In this case, the third information may further include information that indicates that the transmission resource is used only by the terminal 102 for transmission and/or information used to indicate that the transmission resource is used only for the group-related service.

In another possible implementation, if the network device 103 determines that the transmission resource requested by the terminal 101 by using the first information is used only by the at least one terminal 102 for transmission, the network device 103 may alternatively not indicate the transmission resource to the at least one terminal 102 by using the terminal 101.

For example, the network device 103 may allocate a third transmission resource, where the third transmission resource is used by the at least one terminal 102 for transmission. The network device 103 may send seventh information to the at least one terminal 102, where the seventh information carries information about the third transmission resource, thereby indicating the third transmission resource to the at least one terminal 102. The seventh information herein may further carry information used to indicate that the third transmission resource is used only by the at least one terminal 102 for transmission, and/or the seventh information may further indicate that the third transmission resource is used only for the group-related service. For a specific manner thereof, refer to the description in the manner 1.

During implementation, the network device 103 may alternatively send the seventh information to the plurality of terminals 102, thereby indicating the first transmission resource to the plurality of terminals 102 for sharing. The plurality of terminals 102 may share the first transmission resource in a manner such as contention-based use, polling-based use, or random use. During implementation, the network device 103 may send a plurality of pieces of seventh information to the plurality of terminals 102 in a multicast manner. Alternatively, the terminal 101 may separately send the seventh information to the plurality of terminals 102 in a unicast manner.

Figure 6:
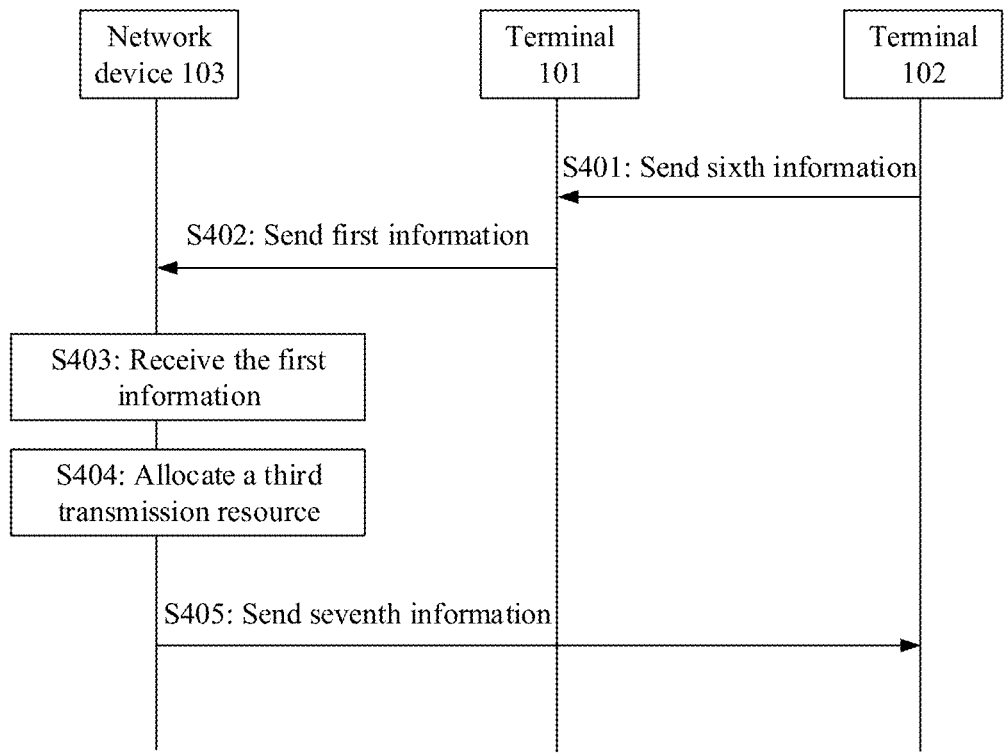
FIG. 6 is a schematic flowchart of a communication method according to this application.

As shown in FIG. 6, in a communication method provided in an embodiment of this application, if the transmission resource requested by the terminal 101 is used only by the terminal 102 for transmission, a process in which the terminal 101 requests the transmission resource from the network device 103 may alternatively include the following steps.

S401: The terminal 101 receives sixth information sent by the terminal 102, where the sixth information is used to request to allocate the transmission resource to the terminal 102. The sixth information may include a part or all of information in an identifier of the terminal 102, information used to indicate that the transmission resource is used only for the group-related service, or information about a requirement of the terminal 102 for the transmission resource. Before sending the sixth information, the terminal 102 may further determine that the terminal 101 requests, from the network device 103, a transmission resource used by the terminal 102 for transmission.

S402: The terminal 101 sends first information to the network device 103, where the first information is used to request the transmission resource, and the first information may further include a part or all of information in information used to indicate that the transmission resource is used only by the terminal 102 for transmission, the identifier of the terminal 102, the information used to indicate that the transmission resource is used only for the group-related service, or the information about the requirement of the terminal 102 for the transmission resource.

S403: The network device 103 receives the first information. During implementation of S403, if the network device 103 stores a terminal identifier of the head terminal, the network device 103 may determine, based on an identifier of the terminal 101, that the first information is from the head terminal. Alternatively, the network device 103 may determine, based on information that is in the first information and that is used to indicate that the terminal 101 is the head terminal in the terminal apparatus group to which the terminal 101 belongs, that the first information is from the head terminal.

S404: The network device 103 determines a third transmission resource.

S405: The network device 103 sends seventh information to the terminal 102, where the seventh information carries information about the third transmission resource, and the seventh information may further include information used to indicate that the third transmission resource is used only by the terminal 102 for transmission and/or information used to indicate that the third transmission resource is used only for the group-related service.

Specifically, in step S405, the network device 103 may send the seventh information to one terminal 102, thereby indicating the third transmission resource to the terminal 102, and the terminal 102 exclusively uses the transmission resource. The network device 103 may alternatively send the seventh information to a plurality of terminals 102 in the terminal apparatus group shown in the vehicle platoon 200, where each piece of seventh information carries the information about the third transmission resource, so that the network device 103 can indicate the third transmission resource to the plurality of terminals 102, and the plurality of terminals 102 share the transmission resource. The plurality of terminals 102 may share the third transmission resource in a manner such as contention-based use, polling-based use, or random use.

Manner 3: The transmission resource requested by the terminal 101 from the network device 103 is used by the at least one terminal 102 and the terminal 101 for transmission.

Before step S101, the terminal 101 may receive the sixth information sent by the at least one terminal 102, to determine that the transmission resource used by the at least one terminal 102 for transmission needs to be requested from the network device 103. Based on this, in a feasible manner, the network device 103 may allocate the first transmission resource, use the second information to carry the information about the first transmission resource, and send the second information to the terminal 101. The first transmission resource is shared by the at least one terminal 102 and the terminal 101. The network device 103 may further use the second information to carry information used to indicate that the first transmission resource is shared by the at least one terminal 102 and the terminal 101. For example, two specific bits in the second information may be set to 10, to indicate that the first transmission resource indicated by the second information is used by the terminal 101 and the at least one terminal 102 for transmission. In this manner, after receiving the second information, the terminal 101 may determine, in the first transmission resource, the third transmission resource used by the at least one terminal 102, and send the information about the third transmission resource to the at least one terminal 102 by using the third information.

For example, after receiving the second information, the terminal 101 may determine, in the first transmission resource indicated by the second information, the second transmission resource used by the terminal 101, and/or determine, in the first transmission resource, the third transmission resource used by the at least one terminal 102. Then, the terminal 101 may send the third information to the at least one terminal 102, and use the third information to carry the information about the third transmission resource.

The terminal 101 may send the third information to the plurality of terminals 102, thereby indicating the third transmission resource to the plurality of terminals 102 for sharing. The plurality of terminals 102 may share the third transmission resource in a manner such as contention-based use, polling-based use, or random use.

Figure 7:
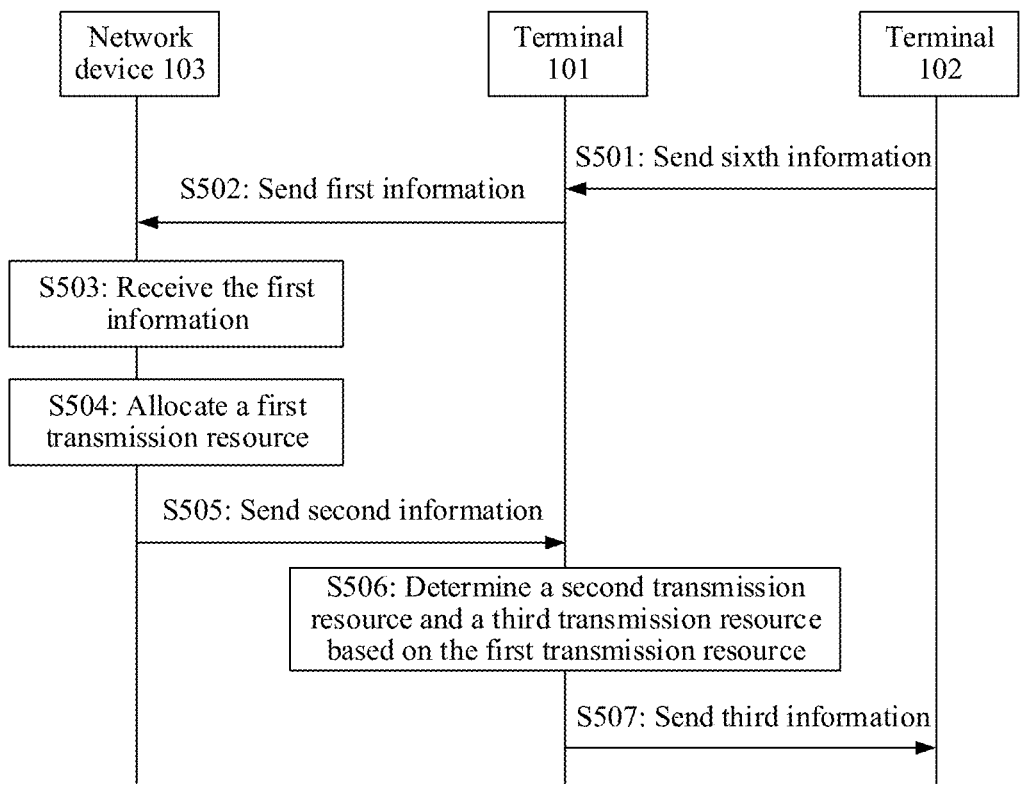
FIG. 7 is a schematic flowchart of a communication method according to this application.

As shown in FIG. 7, in a communication method provided in an embodiment of this application, if the transmission resource requested by the terminal 101 is used by the terminal 102 and the terminal 101 for transmission, a process in which the terminal 101 requests the transmission resource from the network device 103 may include the following steps.

S501: The terminal 101 receives sixth information sent by the terminal 102, where the sixth information is used to request to allocate a transmission resource to the terminal 102, and the sixth information may include a part or all of information in an identifier of the terminal 102, information used to indicate that the transmission resource is used only for the group-related service, or information about a requirement of the terminal 102 for the transmission resource. Before sending the sixth information, the terminal 102 may further determine that the terminal 101 requests, from the network device 103, the transmission resource used by the terminal 102 for transmission.

S502: The terminal 101 sends first information to the network device 103, where the first information is used to request the transmission resource, the first information may further carry information used to indicate that the transmission resource is used by the terminal 101 and the terminal 102 for transmission, and/or carry information used to indicate that the transmission resource is used only for the group-related service, and the first information may further include a part or all of information in an identifier of the terminal 101, the identifier of the terminal 102, the information used to indicate that the transmission resource is used only for the group-related service, information about a requirement of the terminal 101 for the transmission resource, or the information about the requirement of the terminal 102 for the transmission resource.

S503: The network device 103 receives the first information. During implementation of S503, if the network device 103 stores a terminal identifier of the head terminal, the network device 103 may determine, based on the identifier of the terminal 101, that the first information is from the head terminal. Alternatively, the network device 103 may determine, based on information that is in the first information and that is used to indicate that the terminal 101 is the head terminal in the terminal apparatus group to which the terminal 101 belongs, that the first information is from the head terminal.

S504: The network device 103 determines a first transmission resource.

S505: The network device 103 sends second information to the terminal 101, where the second information carries information about the first transmission resource, and the second information may further carry information used to indicate that the first transmission resource is used by the terminal 101 and the terminal 102 for transmission, and/or carry information used to indicate that the first transmission resource is used only for the group-related service.

S506: The terminal 101 determines, in the first transmission resource indicated by the second information, a second transmission resource used by the terminal 101 and a third transmission resource used by the terminal 102.

S507: The terminal 101 sends third information to the terminal 102, where the third information carries information about the third transmission resource, and the third information may further carry information used to indicate that the third transmission resource is used only by the terminal 102 for transmission and/or information used to indicate that the third transmission resource is used only for the group-related service.

Specifically, in step S507, the terminal 101 may send the third information to one terminal 102, thereby indicating the third transmission resource to the terminal 102, and the terminal 102 exclusively uses the transmission resource. The terminal 101 may alternatively send the third information to a plurality of terminals 102 in the terminal apparatus group shown in the vehicle platoon 200, where each piece of third information carries the information about the third transmission resource, so that the terminal 101 can indicate the third transmission resource to the plurality of terminals 102, and the plurality of terminals 102 share the transmission resource. The plurality of terminals 102 may share the third transmission resource in a manner such as contention-based use, polling-based use, or random use.

In step S505, the terminal 101 may determine, in a plurality of manners, the second transmission resource used by the terminal 101 and the third transmission resource used by the terminal 102. Details of the manners are as follows.

For example, the terminal 101 may determine, in the first transmission resource, the second transmission resource used by the terminal 101 and/or the third transmission resource used by the at least one terminal 102. For example, the terminal 101 may determine, based on the requirement of the terminal 101 for the transmission resource and the requirement of the at least one terminal 102 for the transmission resource, the second transmission resource used by the terminal 101 and/or the third transmission resource used by the at least one terminal 102. The requirement of the terminal 102 for the transmission resource may be carried in the sixth information sent by the terminal 102 to the terminal 101.

For example, the network device 103 may further use the second information to carry information about the second transmission resource and information used to indicate that the second transmission resource is used only by the terminal 101 for transmission. In this case, the terminal 101 may determine the third transmission resource based on the first transmission resource and the second transmission resource, and indicate the third transmission resource to the at least one terminal 102 by using the third information. For example, the third transmission resource is a part other than the second transmission resource in the first transmission resource.

For example, the network device 103 may further use the second information to carry the information about the third transmission resource and information used to indicate that the third transmission resource is used only by the at least one terminal 102 for transmission. In this case, the terminal 101 may use the third information to carry the information about the third transmission resource, and send the third information to the at least one terminal 102. It should be understood that, in the foregoing implementation, the network device 103 may further indicate, by using the second information, that the first transmission resource is used only for the group-related service. For a specific manner of the indication, refer to the description in the manner 1. In addition, the third information sent by the terminal 101 to the at least one terminal 102 may also be used to indicate that the third transmission resource is used only for the group-related service.

In addition, it should be understood that, during implementation of this application, the terminal 101 may alternatively allocate, to each terminal 102 based on the determined third transmission resource, a transmission resource exclusively used by the terminal. For example, the terminal 101 allocates a part of the third transmission resource to one of the at least one terminal 102 based on information about a requirement of each of the at least one terminal 102 for the transmission resource, and sends the third information including the transmission resource to the terminal 102. Alternatively, the terminal 101 may determine, for each terminal 102 in the first transmission resource indicated by the second information, a third transmission resource exclusively used by the terminal 102, and send information about the third transmission resource to the corresponding terminal 102 by using the third information.

In another possible implementation, the network device 103 may allocate the second transmission resource used by the terminal 101 and the third transmission resource used by the at least one terminal 102, and send the second information to the terminal 101. The second information carries information about the second transmission resource, the information about the third transmission resource, information used to indicate that the second transmission resource is used only by the terminal 101 for transmission, and information used to indicate that the third transmission resource is used only by the at least one terminal 102 for transmission. In this way, after receiving the second information, the terminal 101 may indicate, to the at least one terminal 102 by using the third information, the third transmission resource that is used only by the at least one terminal 102 for transmission.

The terminal 101 may send the third information to the plurality of terminals 102, thereby indicating the third transmission resource to the plurality of terminals 102 for sharing. The plurality of terminals 102 may share the third transmission resource in a manner such as contention-based use, polling-based use, or random use.

The terminal 101 may alternatively allocate, to each terminal 102 based on the third transmission resource, a transmission resource exclusively used by the terminal. For example, the terminal 101 allocates a part of the third transmission resource to one of the at least one terminal 102 based on information about a requirement of each of the at least one terminal 102 for the transmission resource, and sends the third information including the transmission resource to the terminal 102.

During implementation, the third information may further include information that indicates that the transmission resource is used only by the terminal 102 for transmission and/or the information used to indicate that the transmission resource is used only for the group-related service.

In another possible implementation, the network device 103 may allocate the second transmission resource used by the terminal 101 and the third transmission resource used by the at least one terminal 102, send the second information carrying the second transmission resource to the terminal 101, to indicate the second transmission resource, and send third information carrying the third transmission resource to the at least one terminal 102, to indicate the third transmission resource. The second information may further carry information used to indicate that the second transmission resource is used only by the terminal 101 for transmission, and/or the third information carries information used to indicate that the third transmission resource is used only by the at least one terminal 102 for transmission.

In the foregoing manner, the network device 103 may alternatively send the third information to the plurality of terminals 102, thereby indicating the third transmission resource to the plurality of terminals 102 for sharing. The plurality of terminals 102 that receive the plurality of pieces of third information may share the third transmission resource in a manner such as contention-based use, polling-based use, or random use.

It should be understood that the second information herein may further indicate that the second transmission resource is used only for the group-related service, and/or the third information may further indicate that the third transmission resource is used only for the group-related service. For a specific manner of the indication, refer to the description in the manner 1.

Figure 8:
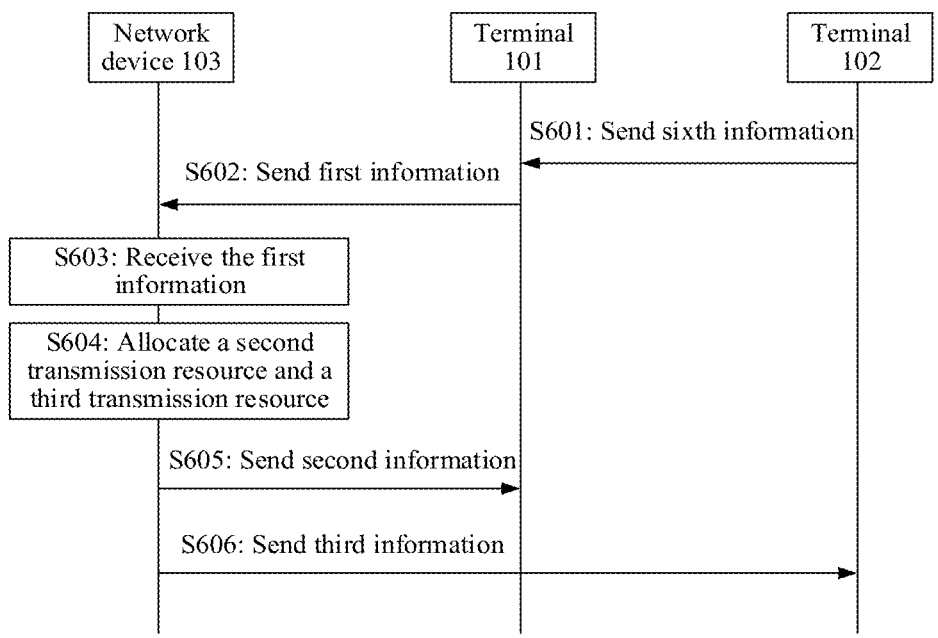
FIG. 8 is a schematic flowchart of a communication method according to this application.

As shown in FIG. 8, in a communication method provided in an embodiment of this application, if the transmission resource requested by the terminal 101 is used by the terminal 102 and the terminal 101 for transmission, a process in which the terminal 101 requests the transmission resource from the network device 103 may alternatively include the following steps.

S601: The terminal 101 receives sixth information sent by the terminal 102, where the sixth information is used to request to allocate a transmission resource to the terminal 102. The sixth information may include a part or all of information in an identifier of the terminal 102, information used to indicate that the transmission resource is used only for the group-related service, or information about a requirement of the terminal 102 for the transmission resource.

Before sending the sixth information, the terminal 102 may further determine that the terminal 101 requests, from the network device 103, the transmission resource used by the terminal 102 for transmission.

S602: The terminal 101 sends first information to the network device 103, where the first information is used to request the transmission resource, and the first information may carry a part or all of information in information used to indicate that the transmission resource is used by the terminal 101 and the terminal 102 for transmission, the information used to indicate that the transmission resource is used only for the group-related service, the identifier of the terminal 102, the information used to indicate that the transmission resource is used only for the group-related service, information about a requirement of the terminal 101 for the transmission resource, or the information about the requirement of the terminal 102 for the transmission resource.

S603: The network device 103 receives the first information. During implementation of S603, if the network device 103 stores a terminal identifier of the head terminal, the network device 103 may determine, based on the identifier of the terminal 101, that the first information is from the head terminal. Alternatively, the network device 103 may determine, based on information that is in the first information and that is used to indicate that the terminal 101 is the head terminal in the terminal apparatus group to which the terminal 101 belongs, that the first information is from the head terminal.

S604: The network device 103 determines a second transmission resource and a third transmission resource, where the second transmission resource is used by the terminal 101 and the terminal 102 for transmission, and the third transmission resource is used by the terminal 102 for transmission.

S605: The network device 103 sends second information to the terminal 102, where the second information carries information about the second transmission resource. The second information may further include information used to indicate that a first transmission resource is used by the terminal 101 for transmission and/or information used to indicate that the second transmission resource is used only for the group-related service.

S606: The network device 103 sends third information to the terminal 102, where the third information carries information about the third transmission resource, and third information may further include information used to indicate that the third transmission resource is used only by the terminal 102 for transmission and/or information used to indicate that the third transmission resource is used only for the group-related service.

It should be understood that there is no strict time sequence limitation between the steps shown in S605 and S606, and the steps shown in S605 and S606 may be performed successively, or may be performed simultaneously.

Specifically, in step S606, the network device 103 may send the third information to one terminal 102, thereby indicating the third transmission resource to the terminal 102, and the terminal 102 exclusively uses the transmission resource. The network device 103 may alternatively send the third information to a plurality of terminals 102 in the terminal apparatus group shown in the vehicle platoon 200, where each piece of third information carries the information about the third transmission resource, so that the network device 103 can indicate the third transmission resource to the plurality of terminals 102, and the plurality of terminals 102 share the transmission resource. The plurality of terminals 102 may share the third transmission resource in a manner such as contention-based use, polling-based use, or random use.

For example, in step S101, the terminal 101 may send the first information by using a new radio resource control (RRC) message. For example, the terminal 101 may send the first information to the network device 103 by using a sidelink resource allocation assistance message. Alternatively, the terminal 101 may send the first information by using an existing RRC message. For example, the terminal 101 may send the first information to the network device 103 by using the RRC message such as sidelink UE information or UE assistance information. Specifically, the first information is added to the sidelink UE information or the UE assistance information.

The terminal 101 may alternatively send the first information by using a medium access control (MAC) message. For example, the terminal 101 may send the first information to the network device 103 by using a buffer status report (BSR). It may be specified (for example, preconfigured in a network and a terminal) that a logical channel identifier or a BSR whose logical channel identifier belongs to a range is used to send the first information in this application.

In addition, the first information may alternatively be information carried on a physical uplink control channel (PUCCH). During implementation, a PUCCH has a relatively small quantity of available bits, and is suitable for reporting a resource collision ratio, for example, a channel busy ratio (CBR).

The foregoing describes, with reference to FIG. 1 to FIG. 8, the communication methods provided in the embodiments of this authorization. The following describes, with reference to FIG. 9 to FIG. 12, communications apparatuses provided in the embodiments of this authorization. The communications apparatuses described herein may be configured to perform the communication methods provided in the embodiments of this application. It may be understood that, to implement the foregoing functions, the communications apparatuses described below may include corresponding hardware structures and/or software modules for performing the functions. A person skilled in the art should be easily aware that, in combination with units and algorithm steps of the examples described in the embodiments disclosed in this specification, this application may be implemented by hardware, computer software, or a combination of hardware and computer software. Whether a function is performed by hardware or hardware driven by computer software depends on particular applications and design constraints of the technical solutions.

Figure 9:
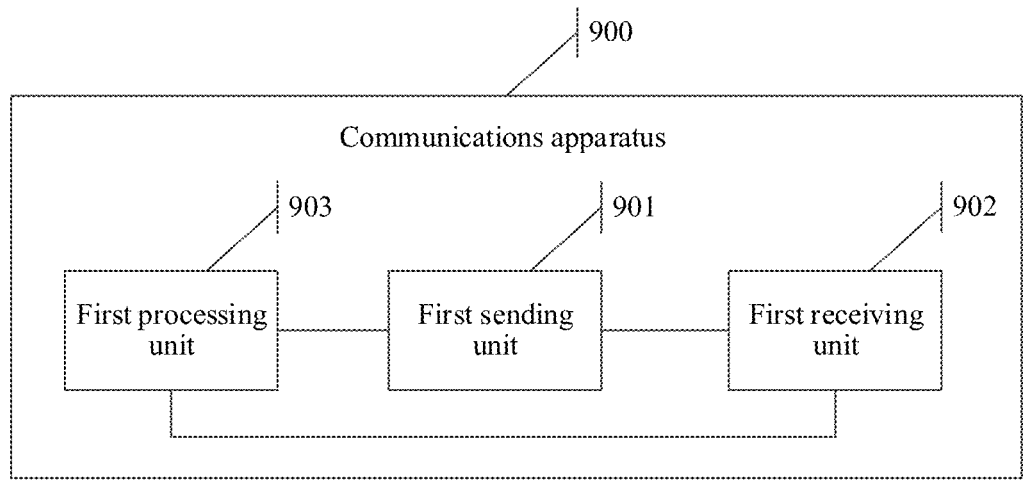
FIG. 9 is a schematic structural diagram of a communications apparatus according to this application.

FIG. 9 shows a communications apparatus 900 according to an embodiment of this application. For example, the communications apparatus 900 may be configured to perform the steps performed by the terminal 101 (namely, a first terminal apparatus) in the communication method provided in the embodiments of this application.

For example, the communications apparatus 900 may include a first sending unit 901. The first sending unit 901 may be configured to send first information to a network device. The first information is used to request a transmission resource.

The transmission resource is used by a second terminal apparatus and/or the communications apparatus 900 for transmission, and the second terminal apparatus and the communications apparatus 900 belong to a same terminal apparatus group.

For example, the first information includes information used to indicate that the transmission resource is used only by the communications apparatus 900 for transmission; or the first information includes information used to indicate that the transmission resource is used only by the second terminal apparatus for transmission; or the first information includes information used to indicate that the transmission resource is used by the second terminal apparatus and the communications apparatus 900 for transmission.

For example, the communications apparatus 900 further includes a first receiving unit 902. The first receiving unit 902 may be configured to receive second information sent by the network device, where the second information includes information about a first transmission resource, and the first transmission resource is used by the communications apparatus 900 and/or the second terminal apparatus for transmission.

For example, the second information further includes information used to indicate that the first transmission resource is used only by the communications apparatus 900 for transmission.

For example, the second information further includes information used to indicate that the first transmission resource is used only by the second terminal apparatus for transmission, and the first sending unit 901 is further configured to: send third information to the second terminal apparatus, where the third information includes information about a fourth transmission resource, the fourth transmission resource is used by the second terminal apparatus for transmission, and the first transmission resource includes the fourth transmission resource; or send third information to the second terminal apparatus and a third terminal apparatus, where the third information includes information about a fourth transmission resource, the fourth transmission resource is used by the second terminal apparatus and the third terminal apparatus for transmission, and the first transmission resource includes the fourth transmission resource.

For example, the first transmission resource is used by the second terminal apparatus and the communications apparatus 900 for transmission, the second information further includes information about a second transmission resource and information used to indicate that the second transmission resource is used only by the communications apparatus 900 for transmission, the first transmission resource includes the second transmission resource, and the communications apparatus 900 further includes a first processing unit 903. The first processing unit 903 may be configured to: determine a third transmission resource based on the first transmission resource and the second transmission resource, where the third transmission resource is used by the second terminal apparatus for transmission, and the first transmission resource includes the third transmission resource. The first sending unit 901 is further configured to: send third information to the second terminal apparatus, where the third information includes information about a fourth transmission resource, the fourth transmission resource is used by the second terminal apparatus for transmission, and the third transmission resource includes the fourth transmission resource; or send third information to the second terminal apparatus and a third terminal apparatus, where the third information includes information about a fourth transmission resource, the fourth transmission resource is used by the second terminal apparatus and the third terminal apparatus for transmission, and the third transmission resource includes the fourth transmission resource.

For example, the first transmission resource is used by the second terminal apparatus and the communications apparatus 900 for transmission, the second information further includes information about a third transmission resource and information used to indicate that the third transmission resource is used only by the second terminal apparatus for transmission, and the first transmission resource includes the third transmission resource. The first sending unit 901 is further configured to: send third information to the second terminal apparatus, where the third information includes information about a fourth transmission resource, the fourth transmission resource is used by the second terminal apparatus for transmission, and the third transmission resource includes the fourth transmission resource; or send third information to the second terminal apparatus and a third terminal apparatus, where the third information includes information about a fourth transmission resource, the fourth transmission resource is used by the second terminal apparatus and the third terminal apparatus for transmission, and the third transmission resource includes the fourth transmission resource.

For example, the communications apparatus 900 further includes a first processing unit 903. The first processing unit 903 is configured to determine a third transmission resource based on the first transmission resource, where the third transmission resource is used by the second terminal apparatus for transmission, and the first transmission resource is used by the second terminal apparatus and the communications apparatus 900 for transmission. The first sending unit 901 is further configured to: send third information to the second terminal apparatus, where the third information includes information about a fourth transmission resource, the fourth transmission resource is used by the second terminal apparatus for transmission, and the third transmission resource includes the fourth transmission resource; or send third information to the second terminal apparatus and a third terminal apparatus, where the third information includes information about a fourth transmission resource, the fourth transmission resource is used by the second terminal apparatus and the third terminal apparatus for transmission, and the third transmission resource includes the fourth transmission resource.

For example, the second information further includes information used to indicate that the first transmission resource is used by the second terminal apparatus and the communications apparatus 900 for transmission.

For example, the communications apparatus 900 further includes a first receiving unit 902. The first receiving unit 902 is configured to receive second information sent by the network device, where the second information includes information about a second transmission resource, information about a third transmission resource, information used to indicate that the second transmission resource is used by the communications apparatus 900 for transmission, and information used to indicate that the information about the third transmission resource is used by the second terminal apparatus for transmission. The first sending unit 901 is further configured to send third information to the second terminal apparatus, where the third information includes information about a fourth transmission resource, the fourth transmission resource is used by the second terminal apparatus for transmission, and the third transmission resource includes the fourth transmission resource; or send third information to the second terminal apparatus and a third terminal apparatus, where the third information includes information about a fourth transmission resource, the fourth transmission resource is used by the second terminal apparatus and the third terminal apparatus for transmission, and the third transmission resource includes the fourth transmission resource.

For example, the communications apparatus 900 further includes a first receiving unit 902. The first receiving unit 902 is configured to receive fourth information sent by the network device may be further received, where the fourth information includes information used to indicate that the communications apparatus 900 requests the transmission resource from the network device; or the fourth information includes load information of the network device, and the load information is used to determine that the communications apparatus 900 requests the transmission resource from the network device.

For example, the first sending unit 901 is further configured to send fifth information to the second terminal apparatus, where the fifth information includes information used to indicate that the communications apparatus 900 requests the transmission resource from the network device.

For example, the communications apparatus 900 further includes a first receiving unit 902. The first receiving unit 902 may be configured to receive sixth information sent by the second terminal apparatus, where the sixth information is used to request to allocate a transmission resource to the second terminal apparatus.

For example, the communications apparatus 900 further includes a first processing unit 903. The first processing unit 903 is configured to determine that a preset condition is met. The preset condition includes one or more of the following conditions: the communications apparatus 900 determines that duration since the last time of sending of the first information reaches preset duration; or the communications apparatus 900 receives the fifth information sent by the second terminal apparatus, where the fifth information is used to request to allocate the transmission resource to the second terminal apparatus; or the communications apparatus 900 determines that a quantity of second terminal apparatuses in the terminal apparatus group changes; or the communications apparatus 900 determines that the second terminal apparatus changes to the first terminal apparatus; or if the terminal apparatus group is a vehicle platoon, the communications apparatus 900 determines that limiting speed of the vehicle platoon changes.

For example, the first information includes a part or all of the following information: information used to indicate that the communications apparatus 900 is a head terminal apparatus in the terminal apparatus group; or an identifier of the second terminal apparatus; or an identifier of the terminal apparatus group; or information used to indicate that the transmission resource is used for a group-related service; or the information used to indicate that the transmission resource is used only by the second terminal apparatus for transmission; or the information used to indicate that the transmission resource is used only by the communications apparatus 900 for transmission; or the information used to indicate that the transmission resource is used by the second terminal apparatus and the communications apparatus 900 for transmission; or quantity information of the second terminal apparatus and the communications apparatus 900; or information used to indicate traffic of the transmission resource; or information used to indicate a resource amount of the transmission resource; or information used to indicate a busy ratio that corresponds when a terminal apparatus in the terminal apparatus group uses a sidelink resource; or information used, when the terminal apparatus group is the vehicle platoon, to indicate the limiting speed of the vehicle platoon; or a moment of starting to use the transmission resource; or a moment of finishing using the transmission resource; or information that indicates a QoS requirement.

Figure 10:
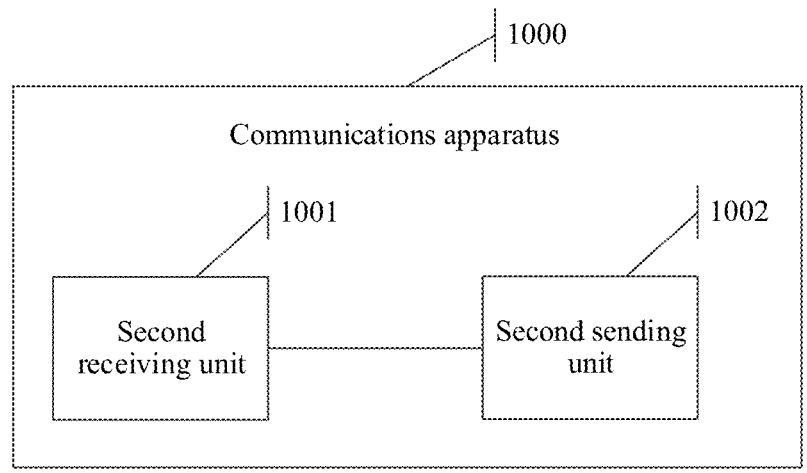
FIG. 10 is a schematic structural diagram of a communications apparatus according to this application.

FIG. 10 shows a communications apparatus 1000 according to an embodiment of this application. For example, the communications apparatus 1000 may be configured to perform the steps performed by the terminal 102 (namely, a second terminal apparatus) in the communication method provided in the embodiments of this application.

For example, the communications apparatus 1000 may include a second receiving unit 1001. The second receiving unit 1001 may be configured to receive resource indication information, where the resource indication information includes information about a third transmission resource; and the resource indication information is sent by a first terminal apparatus, and the first terminal apparatus and the communications apparatus 1000 belong to a same terminal apparatus group; or the resource indication information is sent by a network device.

For example, the communications apparatus 1000 further includes a second sending unit 2002. The second sending unit 1002 is configured to send sixth information to the first terminal apparatus, where the sixth information includes a part or all of the following information: an identifier of the communications apparatus 1000; or information used to indicate that a transmission resource is used only for a group-related service; or information used to indicate traffic of the transmission resource; or information used to indicate a resource amount of the transmission resource; or a moment of starting to use the transmission resource; or a moment of finishing using the transmission resource; or the information that indicates a QoS requirement.

For example, the second receiving unit 1001 is further configured to: receive fourth information sent by the network device, where the fourth information includes information used to indicate that the first terminal apparatus requests the transmission resource from the network device; or the fourth information includes load information of the network device, and the load information is used to determine that the first terminal apparatus requests the transmission resource from the network device; or receive fifth information sent by the first terminal apparatus, where the fifth information includes information used to indicate that the first terminal apparatus requests the transmission resource from the network device.

Figure 11:
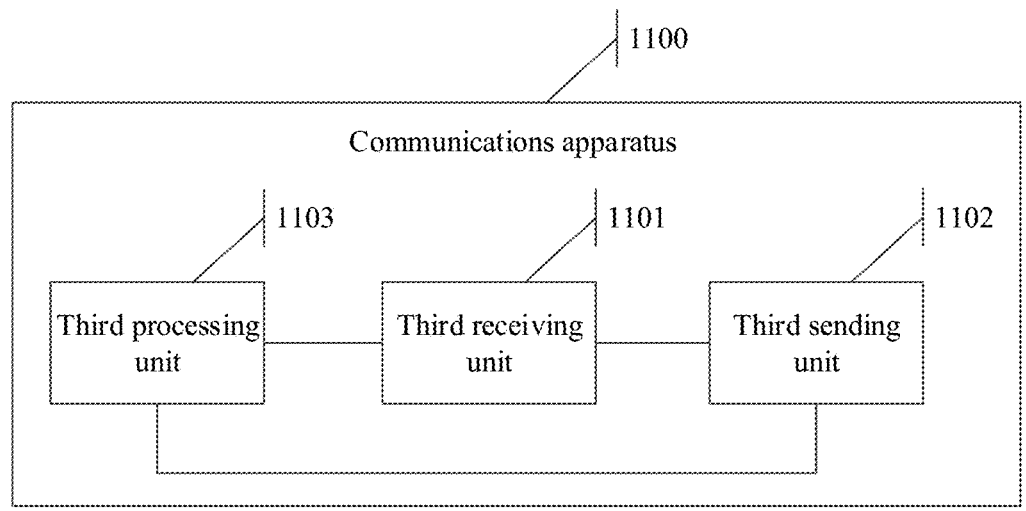
FIG. 11 is a schematic structural diagram of a communications apparatus according to this application.

FIG. 11 shows a communications apparatus 1100 according to an embodiment of this application. For example, the communications apparatus 1100 may be configured to perform the steps performed by the network device 103 in the communication method provided in the embodiments of this application.

For example, the communications apparatus 1100 may include a third receiving unit 1101. The third receiving unit 1101 may be configured to receive first information, where the first information is used to request a transmission resource, where the transmission resource is used by a second terminal apparatus and/or the first terminal apparatus for transmission, and the second terminal apparatus and the first terminal apparatus belong to a same terminal apparatus group.

For example, the communications apparatus 1100 may further include a third sending unit 1102. The third sending unit 1102 may be configured to send second information to the first terminal apparatus, where the second information includes information about a first transmission resource, and the first transmission resource is used by the first terminal apparatus and/or the second terminal apparatus for transmission.

For example, the second information further includes information used to indicate that the first transmission resource is used only by the first terminal apparatus for transmission; or the second information further includes information used to indicate that the first transmission resource is used only by the second terminal apparatus for transmission; or the second information further includes information used to indicate that the first transmission resource is used by the second terminal apparatus and the first terminal apparatus for transmission.

For example, the communications apparatus 1100 may further include a third sending unit 1102. The third sending unit 1102 may be configured to send seventh information to the second terminal apparatus, where the seventh information includes information about a third transmission resource; or the network device sends seventh information to the second terminal apparatus and a third terminal apparatus, where the seventh information includes information about a third transmission resource, and the third terminal apparatus belongs to the terminal apparatus group.

For example, the first transmission resource is used by the second terminal apparatus and the first terminal apparatus for transmission, the second information further includes information about a second transmission resource and information used to indicate that the second transmission resource is used only by the first terminal apparatus for transmission, and the first transmission resource includes the second transmission resource; and/or the first transmission resource is used by the second terminal apparatus and the first terminal apparatus for transmission, the second information further includes information about a third transmission resource and information used to indicate that the third transmission resource is used only by the second terminal apparatus for transmission, and the first transmission resource includes the third transmission resource.

For example, the second information further includes information used to indicate that the first transmission resource is used by the second terminal apparatus and the first terminal apparatus for transmission.

For example, the communications apparatus 1100 may further include a third sending unit 1102. The third sending unit 1102 may be configured to send second information to the first terminal apparatus, where the second information includes information about a second transmission resource, information about a third transmission resource, information used to indicate that the second transmission resource is used by the first terminal apparatus for transmission, and information used to indicate that the third transmission resource is used by the second terminal apparatus for transmission.

For example, the communications apparatus 1100 may further include a third sending unit 1102, configured to: send second information to the first terminal apparatus, and send seventh information to the second terminal apparatus, where the second information includes information about a second transmission resource, and the seventh information includes information about a third transmission resource; or send second information to the first terminal apparatus, and send seventh information to the second terminal apparatus and a third terminal apparatus, where the seventh information includes information about a third transmission resource, and the third terminal apparatus belongs to the terminal apparatus group.

For example, the communications apparatus 1100 may further include a third processing unit 1103, configured to determine, based on the first information, that the first terminal apparatus is a head terminal apparatus in the terminal apparatus group.

For example, the first information includes an identifier used to indicate that the transmission resource is used for a group-related service, and the communications apparatus 1100 may further include a third processing unit 1103, configured to determine, based on the identifier, that the transmission resource is used for the group-related service.

For example, the second information is further used to indicate that the first transmission resource is used for a group-related service.

For example, the second information is further used to indicate that the second transmission resource is used for a group-related service.

For example, the seventh information is used to indicate that the third transmission resource is used for a group-related service.

For example, the communications apparatus 1100 may further include a third sending unit 1102. The third sending unit 1102 may be configured to send fourth information to a terminal apparatus in the terminal apparatus group, where the fourth information includes information used to indicate that the first terminal apparatus requests the transmission resource from the network device; or the fourth information includes load information of the network device, and the load information is used to determine that the first terminal apparatus requests the transmission resource from the network device.

It should be understood that the foregoing module division manners of the communications apparatus 900, the communications apparatus 1000, and the communications apparatus 1100 are merely examples for description, and it should not be understood as that the apparatuses provided in this application have only the modular structures shown in FIG. 9 to FIG. 11.

Figure 12:
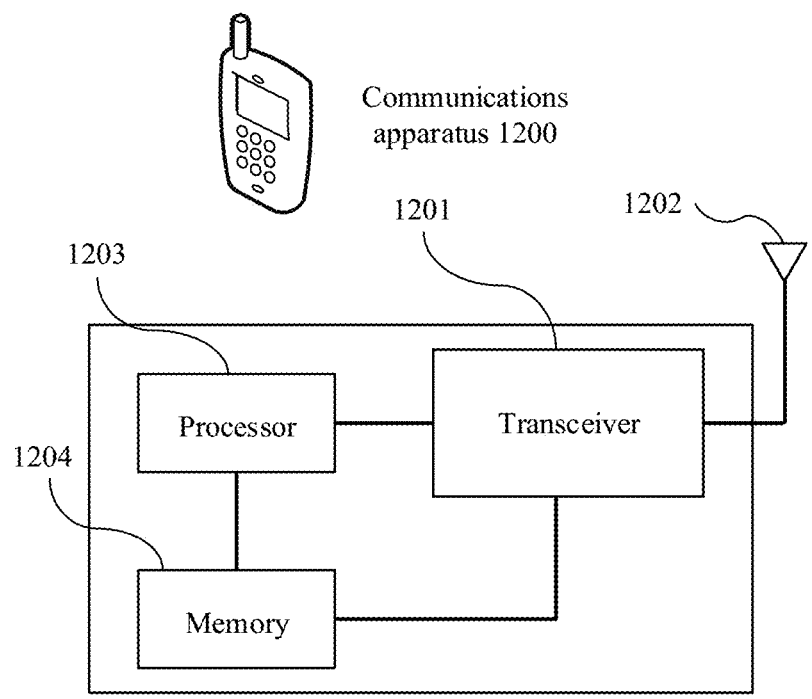
FIG. 12 is a schematic structural diagram of a communications apparatus according to this application.

As shown in FIG. 12, a communications apparatus 1200 provided in an embodiment of this application may further have a structure shown in FIG. 12. It can be learned that the communications apparatus 1200 includes a transceiver 1201 and an antenna 1202. During implementation, the communications apparatus 1200 may further include a processor 1203 and/or a memory 1204. The communications apparatus 1200 may also be implemented by a chip or a chip system.

In a possible design, the communications apparatus 1200 shown in FIG. 12 may be configured to implement functions of the terminal 101 in the embodiments of this application. For example, the transceiver 1201 may be coupled to the antenna 1202, and is configured to support interaction of the communications apparatus 1200, for example, may be used by the communications apparatus 1200 to communicate with the terminal 102 and the network device 103 in this application. For example, the transceiver 1201 may be configured to support the communications apparatus 1200 in performing steps S102, S201, S302, S306, S402, S502, S507, and/or S602 in this application. The transceiver 1201 may be further configured to support the communications apparatus 1200 in receiving the second information sent by the network device 103 in the steps shown in S204, S305, S505, and S605, and may be further configured to support the communications apparatus 1200 in receiving the sixth information sent by the terminal 102 in S301, S401, S501, and S601. The processor 1203 may be used by the communications apparatus 1200 to implement the processing steps related to the terminal 101 in the methods provided in the embodiments of this application. For example, the processor 1203 may be used by the communications apparatus 1200 to perform step S506 shown in FIG. 7. The memory 1204 may store a computer program and an instruction. The memory 1204 may be coupled to the processor 1203 and/or the transceiver 1201, and is configured to support the processor 1203 in invoking the computer program and the instruction in the memory 1204, to implement the processing steps related to the communications apparatus 1200 in the methods provided in the embodiments of this application. In addition, the memory 1204 may be further configured to store the data in the method embodiments of this application, for example, configured to store data and configuration information that are necessary for supporting interaction of the transceiver 1201.

Based on the foregoing structure, the communications apparatus 1200 may implement functions of the communications apparatus 900 shown in FIG. 9. For example, the transceiver 1201 may be configured to implement functions of the first sending unit 901 and the first receiving unit 902 in the communications apparatus 900, and the processor 1203 may be configured to implement functions of the first processing unit 903 in the communications apparatus 900.

For example, the transceiver 1201 in the communications apparatus 1200 may be configured to send first information to a network device. The first information is used to request a transmission resource. The transmission resource is used by a second terminal apparatus and/or the communications apparatus 1200 for transmission, and the second terminal apparatus and the communications apparatus 1200 belong to a same terminal apparatus group.

For example, the first information includes information used to indicate that the transmission resource is used only by the communications apparatus 1200 for transmission; or the first information includes information used to indicate that the transmission resource is used only by the second terminal apparatus for transmission; or the first information includes information used to indicate that the transmission resource is used by the second terminal apparatus and the communications apparatus 1200 for transmission.

For example, the transceiver 1201 may be further configured to receive second information sent by the network device, where the second information includes information about a first transmission resource, and the first transmission resource is used by the communications apparatus 1200 and/or the second terminal apparatus for transmission.

For example, the second information further includes information used to indicate that the first transmission resource is used only by the communications apparatus 1200 for transmission.

For example, the second information further includes information used to indicate that the first transmission resource is used only by the second terminal apparatus for transmission, and the transceiver 1201 may be further configured to: send third information to the second terminal apparatus, where the third information includes information about a fourth transmission resource, the fourth transmission resource is used by the second terminal apparatus for transmission, and the first transmission resource includes the fourth transmission resource; or send third information to the second terminal apparatus and a third terminal apparatus, where the third information includes information about a fourth transmission resource, the fourth transmission resource is used by the second terminal apparatus and the third terminal apparatus for transmission, and the first transmission resource includes the fourth transmission resource.

For example, the first transmission resource is used by the second terminal apparatus and the communications apparatus 1200 for transmission, the second information further includes information about a second transmission resource and information used to indicate that the second transmission resource is used only by the communications apparatus 1200 for transmission, the first transmission resource includes the second transmission resource, and the processor 1203 may be configured to: determine a third transmission resource based on the first transmission resource and the second transmission resource, where the third transmission resource is used by the second terminal apparatus for transmission, and the first transmission resource includes the third transmission resource. The transceiver 1201 may be further configured to: send third information to the second terminal apparatus, where the third information includes information about a fourth transmission resource, the fourth transmission resource is used by the second terminal apparatus for transmission, and the third transmission resource includes the fourth transmission resource; or send third information to the second terminal apparatus and a third terminal apparatus, where the third information includes information about a fourth transmission resource, the fourth transmission resource is used by the second terminal apparatus and the third terminal apparatus for transmission, and the third transmission resource includes the fourth transmission resource.

For example, the first transmission resource is used by the second terminal apparatus and the communications apparatus 1200 for transmission, the second information further includes information about a third transmission resource and information used to indicate that the third transmission resource is used only by the second terminal apparatus for transmission, the first transmission resource includes the third transmission resource, and the transceiver 1201 is further configured to: send third information to the second terminal apparatus, where the third information includes information about a fourth transmission resource, the fourth transmission resource is used by the second terminal apparatus for transmission, and the third transmission resource includes the fourth transmission resource; or send third information to the second terminal apparatus and a third terminal apparatus, where the third information includes information about a fourth transmission resource, the fourth transmission resource is used by the second terminal apparatus and the third terminal apparatus for transmission, and the third transmission resource includes the fourth transmission resource.

For example, the transceiver 1201 may be further configured to determine a third transmission resource based on the first transmission resource, where the third transmission resource is used by the second terminal apparatus for transmission, and the first transmission resource is used by the second terminal apparatus and the communications apparatus 1200 for transmission. The transceiver 1201 may be further configured to: send third information to the second terminal apparatus, where the third information includes information about a fourth transmission resource, the fourth transmission resource is used by the second terminal apparatus for transmission, and the third transmission resource includes the fourth transmission resource; or send third information to the second terminal apparatus and a third terminal apparatus, where the third information includes information about a fourth transmission resource, the fourth transmission resource is used by the second terminal apparatus and the third terminal apparatus for transmission, and the third transmission resource includes the fourth transmission resource.

For example, the second information further includes information used to indicate that the first transmission resource is used by the second terminal apparatus and the communications apparatus 1200 for transmission.

For example, the processor 1203 may be further configured to receive second information sent by the network device, where the second information includes information about a second transmission resource, information about a third transmission resource, information used to indicate that the second transmission resource is used by the communications apparatus 1200 for transmission, and information used to indicate that the information about the third transmission resource is used by the second terminal apparatus for transmission. The transceiver 1201 may be further configured to send third information to the second terminal apparatus, where the third information includes information about a fourth transmission resource, the fourth transmission resource is used by the second terminal apparatus for transmission, and the third transmission resource includes the fourth transmission resource; or send third information to the second terminal apparatus and a third terminal apparatus, where the third information includes information about a fourth transmission resource, the fourth transmission resource is used by the second terminal apparatus and the third terminal apparatus for transmission, and the third transmission resource includes the fourth transmission resource.

For example, the transceiver 1201 may further receive fourth information sent by the network device may be further received, where the fourth information includes information used to indicate that the communications apparatus 1200 requests the transmission resource from the network device; or the fourth information includes load information of the network device, and the load information is used to determine that the communications apparatus 1200 requests the transmission resource from the network device.

For example, the transceiver 1201 may be further configured to send fifth information to the second terminal apparatus, where the fifth information includes information used to indicate that the communications apparatus 1200 requests the transmission resource from the network device.

For example, the transceiver 1201 may be further configured to receive sixth information sent by the second terminal apparatus, where the sixth information is used to request to allocate a transmission resource to the second terminal apparatus.

For example, the processor 1203 may be further configured to determine that a preset condition is met. The preset condition includes one or more of the following conditions: the communications apparatus 1200 determines that duration since the last time of sending of the first information reaches preset duration; or the communications apparatus 1200 receives the fifth information sent by the second terminal apparatus, where the fifth information is used to request to allocate the transmission resource to the second terminal apparatus; or the communications apparatus 1200 determines that a quantity of second terminal apparatuses in the terminal apparatus group changes; or the communications apparatus 1200 determines that the second terminal apparatus changes to the first terminal apparatus; or if the terminal apparatus group is a vehicle platoon, the communications apparatus 1200 determines that limiting speed of the vehicle platoon changes.

For example, the first information includes a part or all of the following information: information used to indicate that the communications apparatus 1200 is a head terminal apparatus in the terminal apparatus group; or an identifier of the second terminal apparatus; or an identifier of the terminal apparatus group; or information used to indicate that the transmission resource is used for a group-related service; or the information used to indicate that the transmission resource is used only by the second terminal apparatus for transmission; or the information used to indicate that the transmission resource is used only by the communications apparatus 1200 for transmission; or the information used to indicate that the transmission resource is used by the second terminal apparatus and the communications apparatus 1200 for transmission; or quantity information of the second terminal apparatus and the communications apparatus 1200; or information used to indicate traffic of the transmission resource; or information used to indicate a resource amount of the transmission resource; or information used to indicate a busy ratio that corresponds when a terminal apparatus in the terminal apparatus group uses a sidelink resource; or information used, when the terminal apparatus group is the vehicle platoon, to indicate the limiting speed of the vehicle platoon; or a moment of starting to use the transmission resource; or a moment of finishing using the transmission resource; or information that indicates a QoS requirement.

In another possible design, the communications apparatus 1200 shown in FIG. 12 may be further configured to implement functions of the terminal 102 in the embodiments of this application. For example, the transceiver 1201 may be coupled to the antenna 1202, and is configured to support interaction of the communications apparatus 1200, for example, may be used by the communications apparatus 1200 to communicate with the terminal 101 and the network device 103 in this application. For example, the transceiver 1201 may be configured to support the communications apparatus 1200 in performing steps S201, S301, S401, S501, and/or S601 in this application. The transceiver 1201 may be further configured to support the communications apparatus 1200 in receiving the third information sent by the terminal 101 in S306 and S507, may be further configured to support the communications apparatus 1200 in receiving the seventh information sent by the network device 103 in step S405, and may be further configured to support the communications apparatus 1200 in receiving the third information sent by the network device 103 in step S606. The processor 1203 may be used by the communications apparatus 1200 to implement the processing steps related to the terminal 102 in the methods provided in the embodiments of this application. For example, the processor 1203 may be used by the communications apparatus 1200 to determine that the terminal 101 requests the transmission resource of the communications apparatus 1200 from the network device 103. The memory 1204 may store a computer program and an instruction. The memory 1204 may be coupled to the processor 1203 and/or the transceiver 1201, and is configured to support the processor 1203 in invoking the computer program and the instruction in the memory 1204, to implement the processing steps related to the communications apparatus 1200 in the methods provided in the embodiments of this application. In addition, the memory 1204 may be further configured to store the data in the method embodiments of this application, for example, configured to store data and configuration information that are necessary for supporting interaction of the transceiver 1201.

Based on the foregoing structure, the communications apparatus 1200 may further implement functions of the communications apparatus 1000 shown in FIG. 10. For example, the transceiver 1201 may be configured to implement functions of the second sending unit 1002 and the second receiving unit 1001 in the communications apparatus 1000.

For example, the transceiver 1201 may be configured to receive resource indication information, where the resource indication information includes information about a third transmission resource; and the resource indication information is sent by a first terminal apparatus, and the first terminal apparatus and the communications apparatus 1200 belong to a same terminal apparatus group; or the resource indication information is sent by a network device.

For example, the transceiver 1201 may be further configured to send sixth information to the first terminal apparatus, where the sixth information includes a part or all of the following information: an identifier of the communications apparatus 1200; or information used to indicate that a transmission resource is used only for a group-related service; or information used to indicate traffic of the transmission resource; or information used to indicate a resource amount of the transmission resource; or a moment of starting to use the transmission resource; or a moment of finishing using the transmission resource; or the information that indicates a QoS requirement.

For example, the transceiver 1201 may be further configured to: receive fourth information sent by the network device, where the fourth information includes information used to indicate that the first terminal apparatus requests the transmission resource from the network device; or the fourth information includes load information of the network device, and the load information is used to determine that the first terminal apparatus requests the transmission resource from the network device; or receive fifth information sent by the first terminal apparatus, where the fifth information includes information used to indicate that the first terminal apparatus requests the transmission resource from the network device.

It should be understood that the communications apparatus 1200 may be specifically a terminal, or may be a chip or a chip system used in a terminal.

Figure 13:
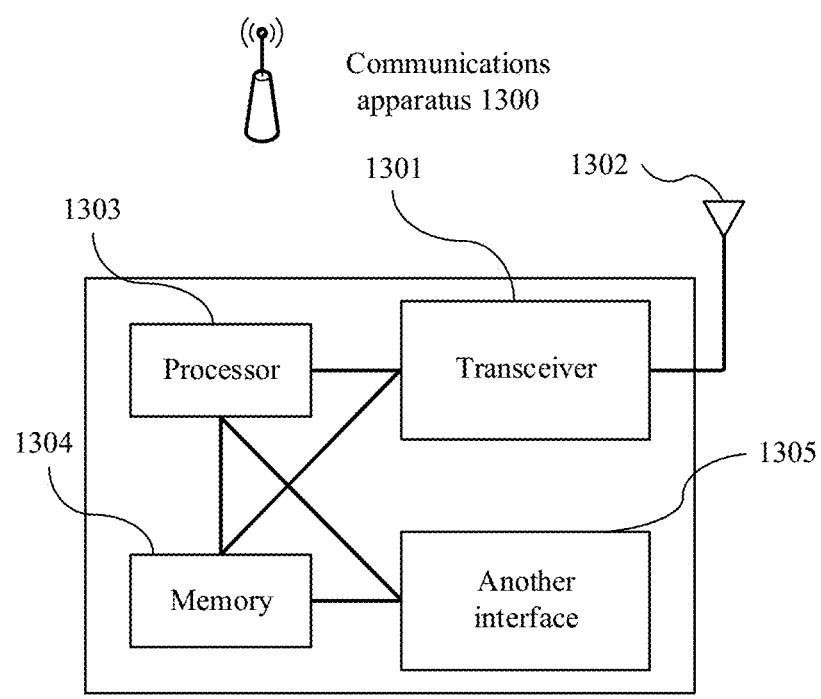
FIG. 13 is a schematic structural diagram of a communications apparatus according to this application.

For example, as shown in FIG. 13, a communications apparatus 1300 provided in an embodiment of this application may include a transceiver 1301 and an antenna 1302. During implementation, the communications apparatus 1300 may further include a processor 1303, a memory 1304, and another interface 1305.

The network device 103 in the embodiments of this application may have a structure shown in the communications apparatus 1300 in FIG. 13. For example, the transceiver 1301 may be coupled to the antenna 1302, and is configured to support interaction of the communications apparatus 1300, for example, may be used by the communications apparatus 1300 to communicate with the terminal 101 and the terminal 102 in this application. For example, the transceiver 1301 may be configured to support the communications apparatus 1300 in performing steps S101, S202, S204, S303, S305, S403, S405, S503, S505, S603, S605, and/or S606 in this application. For example, the processor 1303 may be used by the communications apparatus 1300 to implement the processing steps related to the communications apparatus 1300 in the methods provided in the embodiments of this application, for example, perform steps S203, S304, S404, S504, and/or S604 in this application.

For example, the communications apparatus 1300 may further include the memory 1304. The memory 1304 may store a computer program and an instruction. The memory 1304 may be coupled to the processor 1303, the transceiver 1301, and the another interface 1305, and is configured to support the processor 1303 in invoking the computer program and the instruction in the memory 1304 to implement the steps related to the communications apparatus 1300 in the methods provided in the embodiments of this application. In addition, the memory 1304 may be further configured to store the data in the method embodiments of this application, for example, configured to store data and an instruction that are necessary for interaction of the transceiver 1301 and/or the another interface 1305.

For example, the communications apparatus 1300 may further include the another interface 1305, configured to support interaction of the communications apparatus 1300 that is performed in a wired manner. For example, the another interface 1305 may be an optical fiber link interface, an ethernet interface, or a copper wire interface.

For example, the communications apparatus 1100 shown in FIG. 11 and the modules of the communications apparatus 1100 may be implemented by the communications apparatus 1300 having the structure shown in FIG. 13. For example, the transceiver 1301 may implement functions of the third receiving unit 1101 and the third sending unit 1102 shown in FIG. 11. In addition, the processor 1303 may further implement functions of the third processing unit 11031103.

For example, the transceiver 1301 may be configured to receive first information, where the first information is used to request a transmission resource, where the transmission resource is used by a second terminal apparatus and/or the first terminal apparatus for transmission, and the second terminal apparatus and the first terminal apparatus belong to a same terminal apparatus group.

For example, the transceiver 1301 may be further configured to send second information to the first terminal apparatus, where the second information includes information about a first transmission resource, and the first transmission resource is used by the first terminal apparatus and/or the second terminal apparatus for transmission.

For example, the second information further includes information used to indicate that the first transmission resource is used only by the first terminal apparatus for transmission; or the second information further includes information used to indicate that the first transmission resource is used only by the second terminal apparatus for transmission; or the second information further includes information used to indicate that the first transmission resource is used by the second terminal apparatus and the first terminal apparatus for transmission.

For example, the transceiver 1301 may be further configured to send seventh information to the second terminal apparatus, where the seventh information includes information about a third transmission resource; or the network device sends seventh information to the second terminal apparatus and a third terminal apparatus, where the seventh information includes information about a third transmission resource, and the third terminal apparatus belongs to the terminal apparatus group.

For example, the first transmission resource is used by the second terminal apparatus and the first terminal apparatus for transmission, the second information further includes information about a second transmission resource and information used to indicate that the second transmission resource is used only by the first terminal apparatus for transmission, and the first transmission resource includes the second transmission resource; and/or the first transmission resource is used by the second terminal apparatus and the first terminal apparatus for transmission, the second information further includes information about a third transmission resource and information used to indicate that the third transmission resource is used only by the second terminal apparatus for transmission, and the first transmission resource includes the third transmission resource.

For example, the second information further includes information used to indicate that the first transmission resource is used by the second terminal apparatus and the first terminal apparatus for transmission.

For example, the transceiver 1301 may be further configured to send second information to the first terminal apparatus, where the second information includes information about a second transmission resource, information about a third transmission resource, information used to indicate that the second transmission resource is used by the first terminal apparatus for transmission, and information used to indicate that the third transmission resource is used by the second terminal apparatus for transmission.

For example, the transceiver 1301 may be further configured to: send second information to the first terminal apparatus, and send seventh information to the second terminal apparatus, where the second information includes information about a second transmission resource, and the seventh information includes information about a third transmission resource; or send second information to the first terminal apparatus, and send seventh information to the second terminal apparatus and a third terminal apparatus, where the seventh information includes information about a third transmission resource, and the third terminal apparatus belongs to the terminal apparatus group.

For example, the processor 1303 may be configured to determine, based on the first information, that the first terminal apparatus is a head terminal apparatus in the terminal apparatus group.

For example, the first information includes an identifier used to indicate that the transmission resource is used for a group-related service, and the processor 1303 may be further configured to determine, based on the identifier, that the transmission resource is used for the group-related service.

For example, the second information is further used to indicate that the first transmission resource is used for a group-related service.

For example, the second information is further used to indicate that the second transmission resource is used for a group-related service.

For example, the seventh information is used to indicate that the third transmission resource is used for a group-related service.

For example, the transceiver 1301 may be further configured to send fourth information to a terminal apparatus in the terminal apparatus group, where the fourth information includes information used to indicate that the first terminal apparatus requests the transmission resource from the network device; or the fourth information includes load information of the network device, and the load information is used to determine that the first terminal apparatus requests the transmission resource from the network device.

It should be understood that the communications apparatus 1300 may be specifically a base station, or may be a chip or a chip system used in a base station.

All or some of the foregoing embodiments may be implemented by using software, hardware (for example, a circuit), firmware, or any combination thereof. When software is used to implement the embodiments, the foregoing embodiments may be implemented completely or partially in a form of a computer program product. The computer program product includes one or more computer instructions or computer programs. When the computer instructions or the computer programs are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

The embodiments of the present invention are described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specified function in one or more processes in the flowcharts and/or in one or more blocks in the block diagrams.

These computer program instructions may be stored in a computer-readable memory that can instruct a computer or another programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Obviously, a person skilled in the art can make various modifications and variations to the embodiments of the present invention without departing from the spirit and scope of this application. This application is intended to cover these modifications and variations of the embodiments of the present invention provided that they fall within the scope of the following claims of this application and their equivalent technologies.

What is claimed is:

1. A communication method comprising:
   determining that a preset condition is met,
      wherein the preset condition is a change in a limiting speed of a vehicle platoon comprising a group of terminal apparatus, and
      wherein the group of terminal apparatus includes first and second terminal apparatus;
   after determining the preset condition is met, sending, by the first terminal apparatus, first information to a network device,
      wherein the first information is used to request reallocation of a transmission resource used by the second terminal apparatus and/or the first terminal apparatus for transmission, and
      wherein the first information indicates a new limiting speed of the vehicle platoon resulting from the change in the limiting speed; and
   receiving second information from the network device,
      wherein the second information comprises information about the reallocation of at least a first transmission resource determined by the network device based on the first information.

2. The method according to claim 1, wherein
   the first information comprises information indicating that the transmission resource is used only by the first terminal apparatus for transmission;
   the first information comprises information indicating that the transmission resource is used only by the second terminal apparatus for transmission; or
   the first information comprises information indicating that the transmission resource is used by the second terminal apparatus and the first terminal apparatus for transmission.

3. The method according to claim 1, wherein the method further comprises:
   determining a third transmission resource based on the first transmission resource, wherein the third transmission resource is used by the second terminal apparatus for transmission, and wherein the first transmission resource is used by each of the first and second terminal apparatus for transmission; and
   sending third information to the second terminal apparatus, wherein the third information comprises information about a fourth transmission resource,
      wherein the fourth transmission resource is used by the second terminal apparatus for transmission, and the third transmission resource comprises the fourth transmission resource, or
      wherein the fourth transmission resource is used by the second terminal apparatus and the third terminal apparatus for transmission, and the third transmission resource comprises the fourth transmission resource.

4. The method according to claim 1, wherein the second information further comprises information used to indicating that the first transmission resource is used only by the first terminal apparatus for transmission.

5. The method according to claim 1, wherein the first transmission resource is used by the second terminal apparatus and the first terminal apparatus for transmission, wherein the second information further comprises information about a second transmission resource and information indicating that the second transmission resource is used only by the first terminal apparatus for transmission, wherein the first transmission resource comprises the second transmission resource, and the method further comprises:
   determining, by the first terminal apparatus, a third transmission resource based on the first transmission resource and the second transmission resource, wherein the third transmission resource is used by the second terminal apparatus for transmission, and the first transmission resource comprises the third transmission resource; and implementing one of the following (a) or (b):
(a) sending, by the first terminal apparatus, third information to the second terminal apparatus, wherein the third information comprises information about a fourth transmission resource, the fourth transmission resource is used by the second terminal apparatus for transmission, and the third transmission resource comprises the fourth transmission resource; or
(b) sending, by the first terminal apparatus, third information to the second terminal apparatus and a third terminal apparatus, wherein the third information comprises information about a fourth transmission resource, the fourth transmission resource is used by the second terminal apparatus and the third terminal apparatus for transmission, and the third transmission resource comprises the fourth transmission resource.

6. The method according to claim 1, wherein the second information further comprises information indicating that the first transmission resource is used only by the second terminal apparatus for transmission, and the method further comprises:
sending, by the first terminal apparatus, third information to the second terminal apparatus, wherein the third information comprises information about a fourth transmission resource, the fourth transmission resource is used by the second terminal apparatus for transmission, and the first transmission resource comprises the fourth transmission resource; or
sending, by the first terminal apparatus, third information to the second terminal apparatus and a third terminal apparatus, wherein the third information comprises information about a fourth transmission resource, the fourth transmission resource is used by the second terminal apparatus and the third terminal apparatus for transmission, and the first transmission resource comprises the fourth transmission resource.

7. The method according to claim 1, wherein the first transmission resource is used by the second terminal apparatus and the first terminal apparatus for transmission, the second information further comprises information about a third transmission resource and information indicating that the third transmission resource is used only by the second terminal apparatus for transmission, the first transmission resource comprises the third transmission resource, and the method further comprises:
sending, by the first terminal apparatus, third information to the second terminal apparatus, wherein the third information comprises information about a fourth transmission resource, the fourth transmission resource is used by the second terminal apparatus for transmission, and the third transmission resource comprises the fourth transmission resource; or
sending, by the first terminal apparatus, third information to the second terminal apparatus and a third terminal apparatus, wherein the third information comprises information about a fourth transmission resource, the fourth transmission resource is used by the second terminal apparatus and the third terminal apparatus for transmission, and the third transmission resource comprises the fourth transmission resource.

8. A first terminal apparatus comprising:
at least one processor, and a memory storing instructions for execution by the at least one processor,
wherein, when executed, the instructions cause the first terminal apparatus to perform operations comprising:
determining that a preset condition is met,
wherein the preset condition is a change in a limiting speed of a vehicle platoon comprising a group of terminal apparatus, and
wherein the group of terminal apparatus includes the first and a second terminal apparatus;
after determining the preset condition is met, sending, first information to a network device,
wherein the first information is used to request reallocation of a transmission resource used by the second terminal apparatus and/or the first terminal apparatus for transmission, and
wherein the first information indicates a new limiting speed of the vehicle platoon resulting from the change in the limiting speed; and
receiving second information from the network device, wherein the second information comprises information about the reallocation of at least a first transmission resource determined by the network device based on the first information.

9. The first terminal apparatus according to claim 8, wherein:
the first information comprises information indicating that the transmission resource is used only by the first terminal apparatus for transmission;
the first information comprises information indicating that the transmission resource is used only by the second terminal apparatus for transmission; or
the first information comprises information indicating that the transmission resource is used by the second terminal apparatus and the first terminal apparatus for transmission.

10. The first terminal apparatus according to claim 8, wherein, when executed, the instructions cause the first terminal apparatus to further perform operations comprising:
determining a third transmission resource based on the first transmission resource, wherein the third transmission resource is used by the second terminal apparatus for transmission, and wherein the first transmission resource is used by each of the first and second terminal apparatus for transmission; and
sending third information to the second terminal apparatus, wherein the third information comprises information about a fourth transmission resource,
wherein the fourth transmission resource is used by the second terminal apparatus for transmission, and the third transmission resource comprises the fourth transmission resource, or
wherein the fourth transmission resource is used by the second terminal apparatus and the third terminal apparatus for transmission, and the third transmission resource comprises the fourth transmission resource.

11. The first terminal apparatus according to claim 8, wherein the second information further comprises information indicating that the first transmission resource is used only by the first terminal apparatus for transmission.

12. The first terminal apparatus according to claim 8, wherein the first transmission resource is used by the second terminal apparatus and the first terminal apparatus for transmission, wherein the second information further comprises: information about a second transmission resource and information indicating that the second transmission resource is used only by the first terminal apparatus for transmission, wherein the first transmission resource comprises the second transmission resource, and wherein, when executed, the instructions further cause the first terminal apparatus to perform operations comprising:
  determining, a third transmission resource based on the first transmission resource and the second transmission resource, wherein the third transmission resource is used by the second terminal apparatus for transmission, and the first transmission resource comprises the third transmission resource; and
  implementing one of the following (a) or (b):
  (a) sending, third information to the second terminal apparatus, wherein the third information comprises information about a fourth transmission resource, the fourth transmission resource is used by the second terminal apparatus for transmission, and the third transmission resource comprises the fourth transmission resource; or
  (b) sending, third information to the second terminal apparatus and a third terminal apparatus, wherein the third information comprises information about a fourth transmission resource, the fourth transmission resource is used by the second terminal apparatus and the third terminal apparatus for transmission, and the third transmission resource comprises the fourth transmission resource.

13. The first terminal apparatus according to claim 8, wherein the second information further comprises: information indicating that the first transmission resource is used only by the second terminal apparatus for transmission, and wherein, when executed, the instructions cause the first terminal apparatus to further perform operations comprising:
  sending third information to the second terminal apparatus,
    wherein the third information comprises information about a fourth transmission resource used by the second terminal apparatus for transmission, and the first transmission resource comprises the fourth transmission resource; or
  sending third information to the second terminal apparatus and a third terminal apparatus,
    wherein the third information comprises information about a fourth transmission resource used by the second terminal apparatus and the third terminal apparatus for transmission, and the first transmission resource comprises the fourth transmission resource.

14. The first terminal apparatus according to claim 8, wherein the first transmission resource is used by the second terminal apparatus and the apparatus for transmission, wherein the second information further comprises: information about a third transmission resource indicating that the third transmission resource is used only by the second terminal apparatus for transmission, wherein the first transmission resource comprises the third transmission resource, and wherein, when executed, the instructions cause the first terminal apparatus to further perform operations comprising:
  sending third information to the second terminal apparatus,
    wherein the third information comprises information about a fourth transmission resource used by the second terminal apparatus for transmission, and the third transmission resource comprises the fourth transmission resource; or
  sending third information to the second terminal apparatus and a third terminal apparatus,
    wherein the third information comprises information about a fourth transmission resource used by the second terminal apparatus and the third terminal apparatus for transmission, and the third transmission resource comprises the fourth transmission resource.

15. A non-transitory computer readable memory storage medium comprising processor-executable instructions that, when executed by one or more processors of a first terminal apparatus, facilitate the first terminal apparatus carrying out operations comprising:
  determining that a preset condition is met,
    wherein the preset condition is a change in a limiting speed of a vehicle platoon comprising a group of terminal apparatus, and
    wherein the group of terminal apparatus includes the first terminal apparatus and a second terminal apparatus;
  after determining the preset condition is met, sending, first information to a network device,
    wherein the first information is used to request reallocation of a transmission resource used by the second terminal apparatus and/or the first terminal apparatus for transmission, and
    wherein the first information indicates a new limiting speed of the vehicle platoon resulting from the change in the limiting speed; and
  receiving second information from the network device,
    wherein the second information comprises information about the reallocation of at least a first transmission resource determined by the network device based on the first information.

16. The non-transitory computer readable memory storage medium according to claim 15, wherein:
  the first information comprises information indicating that the transmission resource is used only by the first terminal apparatus for transmission;
  the first information comprises information indicating that the transmission resource is used only by the second terminal apparatus for transmission; or
  the first information comprises information indicating that the transmission resource is used by the second terminal apparatus and the first terminal apparatus for transmission.

17. The non-transitory computer readable memory storage medium according to claim 15, wherein the instructions, when executed, facilitate the first terminal apparatus carrying out further operations comprising:
  determining a third transmission resource based on the first transmission resource, wherein the third transmission resource is used by the second terminal apparatus for transmission, and wherein the first transmission resource is used by each of the first and second terminal apparatus for transmission; and
  sending third information to the second terminal apparatus, wherein the third information comprises information about a fourth transmission resource,
    wherein the fourth transmission resource is used by the second terminal apparatus for transmission, and the third transmission resource comprises the fourth transmission resource, or
    wherein the fourth transmission resource is used by the second terminal apparatus and the third terminal apparatus for transmission, and the third transmission resource comprises the fourth transmission resource.

18. The non-transitory computer readable memory storage medium according to claim 15, wherein the second information further comprises information indicating that the first transmission resource is used only by the first terminal apparatus for transmission.

19. The non-transitory computer readable memory storage medium according to claim 15, wherein the first transmission resource is used by the second terminal apparatus and the first terminal apparatus for transmission, wherein the second information further comprises information about a second transmission resource and information indicating that the second transmission resource is used only by the first terminal apparatus for transmission, wherein the first transmission resource comprises the second transmission resource, and wherein the instructions, when executed, facilitate the first terminal apparatus carrying out further operations comprising:
  determining, a third transmission resource based on the first transmission resource and the second transmission resource used by the second terminal apparatus for transmission, and the first transmission resource comprises the third transmission resource; and
  implementing one of the following (a) or (b):
  (a) sending third information to the second terminal apparatus, wherein the third information comprises information about a fourth transmission resource used by the second terminal apparatus for transmission, and the third transmission resource comprises the fourth transmission resource; or
  (b) sending third information to the second terminal apparatus and a third terminal apparatus, wherein the third information comprises information about a fourth transmission resource used by the second terminal apparatus and the third terminal apparatus for transmission, and the third transmission resource comprises the fourth transmission resource.

20. The non-transitory computer readable memory storage medium according to claim 15, wherein the second information further comprises information indicating that the first transmission resource is used only by the second terminal apparatus for transmission, and wherein the instructions, when executed, the instructions further cause the first terminal apparatus to perform further operations comprising:
  sending third information to the second terminal apparatus, wherein the third information comprises information about a fourth transmission resource used by the second terminal apparatus for transmission, and the first transmission resource comprises the fourth transmission resource; or
  sending third information to the second terminal apparatus and a third terminal apparatus, wherein the third information comprises information about a fourth transmission resource used by the second terminal apparatus and the third terminal apparatus for transmission, and the first transmission resource comprises the fourth transmission resource.

* * * * *